United States Patent
Fushimi et al.

(10) Patent No.: US 12,135,280 B2
(45) Date of Patent: Nov. 5, 2024

(54) POWDERY-MATERIAL MEASUREMENT DEVICE AND METHOD OF CHECKING OR CALIBRATING PROPERTIES OF SENSOR PROBE

(71) Applicant: KIKUSUI SEISAKUSHO LTD., Kyoto (JP)

(72) Inventors: Shinsuke Fushimi, Kyoto (JP); Hikaru Fujisaki, Kyoto (JP); Yuuya Kawai, Kyoto (JP)

(73) Assignee: KIKUSUI SEISAKUSHO LTD., Kyoto (JP)

( * ) Notice: Subject to any disclaimer, the term of this patent is extended or adjusted under 35 U.S.C. 154(b) by 16 days.

(21) Appl. No.: 17/575,170

(22) Filed: Jan. 13, 2022

(65) Prior Publication Data
US 2022/0252510 A1    Aug. 11, 2022

(30) Foreign Application Priority Data
Feb. 10, 2021    (JP) .................................. 2021-020065

(51) Int. Cl.
  *G01N 21/3563*    (2014.01)
  *G01N 1/38*    (2006.01)
  *G01N 21/359*    (2014.01)

(52) U.S. Cl.
  CPC ........... *G01N 21/3563* (2013.01); *G01N 1/38* (2013.01); *G01N 21/359* (2013.01); *G01N 2201/127* (2013.01)

(58) Field of Classification Search
  CPC .... G01N 21/3563; G01N 1/38; G01N 21/359; G01N 2201/127; G01N 21/85;
  (Continued)

(56) References Cited

U.S. PATENT DOCUMENTS

| 4,114,038 A | * | 9/1978 | Parker ..................... G01N 21/15 356/442 |
| 6,137,581 A | | 10/2000 | Kimura et al. |

(Continued)

FOREIGN PATENT DOCUMENTS

| CN | 107957396 A | 4/2018 |
| JP | H06-222001 A | 8/1994 |

(Continued)

OTHER PUBLICATIONS

Leersnyder et al., Development and validation of an in-line NIR spectroscopic method for continuous blend potency determination in the feed frame of a tablet press, 2018, Journal of Pharmaceutical and Biomedical Analysis, vol. 151. pp. 274-283 (Year: 2018).*

*Primary Examiner* — Christine S. Kim
(74) *Attorney, Agent, or Firm* — MCGINN I.P. LAW GROUP, PLLC

(57) ABSTRACT

A powdery-material measurement device includes a sensor probe configured to receive reflected light from mixed-powdery materials passing adjacent thereto or transmitted light through the mixed-powdery materials to measure characteristics of the mixed-powdery materials while the powdery-material measurement device is in operation to deliver the mixed-powdery materials toward an equipment, and a standard sample having known characteristics and facing the sensor probe that is disposed to receive the reflected light from the standard sample or the transmitted light through the standard sample, when the mixed-powdery materials are not present adjacent the sensor probe while the powdery-material measurement device is in operation to deliver the mixed-powdery materials toward the equipment.

20 Claims, 21 Drawing Sheets

(58) Field of Classification Search
CPC ......... G01N 21/93; B01F 23/64; B01F 27/90;
B01F 35/2131; B30B 11/08; B30B
15/0082; B30B 15/304; B30B 11/005
See application file for complete search history.

(56) References Cited

U.S. PATENT DOCUMENTS

| | | | |
|---|---|---|---|
| 6,244,118 B1 * | 6/2001 | Andersson | G01N 1/20 |
| | | | 73/863.52 |
| 2003/0048445 A1 | 3/2003 | Tokhtuev et al. | |
| 2016/0358829 A1 | 12/2016 | Hayashi et al. | |
| 2018/0229462 A1 | 8/2018 | Shimada et al. | |
| 2020/0307139 A1 | 10/2020 | Kitamura et al. | |

FOREIGN PATENT DOCUMENTS

| | | | | |
|---|---|---|---|---|
| JP | 2011156576 A | * | 8/2011 | ............ B30B 15/32 |
| JP | 2016-205790 A | | 12/2016 | |
| JP | 2020-168634 A | | 10/2020 | |
| WO | 2007/148404 A1 | | 12/2007 | |

\* cited by examiner

POWDERY-MATERIAL MEASUREMENT DEVICE AND METHOD OF CHECKING OR CALIBRATING PROPERTIES OF SENSOR PROBE

BACKGROUND

There has been widely known a rotary compression-molding machine that includes a table of a turret having die bores, and an upper punch and a lower punch slidably retained above and below each of the die bores, and that is configured to horizontally rotate the die bores and the punches together to compression mold or tablet a powdery material filled in the die bores when the paired upper and lower punches pass between an upper roll and a lower roll. The molding machine of this type is widely adopted for production of pharmaceutical tablets, food products, electronic components, and the like.

To date, a pharmaceutical tablet or the like has typically been produced through a procedure according to a batch method including forming, from a powdery material as a constituent material, an intermediate product in each of processes such as granulating, drying, grading, and mixing, and lastly including compressing (i.e., tableting) with use of a molding machine.

Such a batch method needs scaling-up several times in order to shift from a small molding machine for research and development to a large molding machine for commercial use. The batch method also needs verification experiment for each scaling-up, which increases the frequency of using a raw powdery material and needs enormous costs. The batch method also includes standby periods between the processes. For example, compressing with use of a molding machine needs previously mixing a powdery material and feeding the molding machine with the powdery material obtained by mixing. The molding machine is in stand-by status without operating during the processes. In other words, the batch method fails to achieve timely feeding of an intermediate product. The batch method also needs facility design for each of the processes and occupation of a large space. More specifically, each of the processes needs a separate chamber and delivery by a worker of an intermediate product to a chamber for the subsequent process.

In view of this, there has been developed a system configured to consistently execute mixing and compressing of powdery materials with no interruption, to directly feed a molding machine with mixed-powdery materials. This system achieves appropriate feed of the mixed-powdery materials to the molding machine that is continuously compressing and tableting the powdery materials.

A powdery-material mixing and feeding device configured to mix powdery materials includes a plurality of feeders each configured to reserve a powdery material and discharge the reserved powdery material, and is configured to mix the powdery materials discharged from the feeders and then feed the mixed-powdery materials to the molding machine and to another equipment configured to execute a post process. Typical examples of the feeders include a volumetric feeder configured to continuously discharge a constant amount of a powdery material per a predetermined time. The volumetric feeder is configured to deliver a powdery material dropping from a hopper reserving the powdery material by a screw feeder, a table feeder, a circle feeder (registered trademark), a rotary feeder, or the like. The volumetric feeder discharges the powdery material having a discharge flow rate per unit time, which is measured by a measuring instrument such as a load cell. A motor functioning as a drive source of the screw feeder or the like is feedback controlled to cause the discharged powdery material to have a target flow rate.

The powdery-material mixing and feeding device includes a measurement device configured to measure characteristics, specifically a mixing degree (whether or not there is segregation) of powdery materials in accordance with near infrared reflectance (NIR), a near infrared absorption spectrum method, or the like. A powdery-material measurement device irradiates mixed-powdery materials being transferred toward a molding machine or the like with a light wave such as near infrared light (or an electromagnetic wave) and causes a sensor probe to receive reflected (or scattered) light or transmitted light to measure reflection and/or absorption of the light wave by the mixed-powdery materials, and to execute a qualitative analysis on uniformity and the like of the mixed-powdery materials and a quantitative analysis based on a spectrum thereof. Any defective powdery material having characteristics such as uniformity departing from a normal range is removed inside the powdery-material mixing and feeding device so as not to be fed to the molding machine (e.g., see JP 2020-168634 A).

Application of the powdery-material mixing and feeding device needs checking or calibrating, as needed, input and output properties of the sensor probe as an element of a measurement device (i.e., relation between characteristics of a target powdery material and a signal outputted from the sensor probe having measured the characteristics).

Dust or dirt generated or not generated from the powdery materials adheres to the sensor probe facing mixed-powdery materials to be transferred. The dust or dirt causes noise to mix with a spectrum of light to be originally received by the sensor probe, namely, reflected light from the mixed-powdery materials to be transferred or transmitted light through the mixed-powdery materials, and eventually causes decrease in S/N ratio of an output signal from the sensor probe.

Without such influence of the dust or dirt, the input and output properties of the sensor probe can have chronological state change. If the powdery-material mixing and feeding device continuously operates without change in input and output properties of the sensor probe being noticed, then the characteristics of mixed-powdery materials cannot be found precisely to cause difficulty in feed of the mixed-powdery materials of high quality to the molding machine or to another equipment.

In a conventional system, the sensor probe is detached from the measurement device after the system temporarily stops, the sensor probe is subjected to calibration of the input and output properties or cleaning as needed, and the system restarts after the sensor probe is attached to the measurement device again. This needs labor of detaching and attaching the sensor probe for each calibration and the system needs to be stopped each time, which leads to deterioration in production efficiency of products made of mixed-powdery materials.

SUMMARY OF THE INVENTION

In view of the above problem, it is an exemplary feature of the present invention to enable checking or calibrating, as needed, properties of a sensor probe without being detached from a measurement device, or keeping high quality of the properties of the sensor probe in operation in the measurement device.

The exemplary invention provides a powdery-material measurement device configured to measure characteristics of mixed-powdery materials obtained by mixing two or more types of powdery materials and then to deliver the mixed-powdery materials toward equipment configured to execute a post process using the mixed-powdery materials. The powdery-material measurement device includes a sensor probe configured to receive reflected light (e.g., an electromagnetic wave) from the mixed-powdery materials passing nearby or transmitted light (e.g., an electromagnetic wave) through the mixed-powdery materials to measure the characteristics of the mixed-powdery materials while the powdery-material measurement device is in operation to deliver the mixed-powdery materials toward the equipment, and a standard sample (or reference piece) having known characteristics and facing the sensor probe that is disposed to receive reflected light from the standard sample or transmitted light through the standard sample, when the mixed-powdery materials are not present near the sensor probe while the powdery-material measurement device is in operation to deliver the mixed-powdery materials toward the equipment.

The exemplary invention also provides a method of checking or calibrating properties of a sensor probe configured to receive reflected light from mixed-powdery materials obtained by mixing two or more types of powdery materials and passing nearby or transmitted light through the mixed-powdery materials in a powdery-material measurement device configured to measure characteristics of the mixed-powdery materials and then deliver the mixed-powdery materials toward equipment configured to execute a post process using the mixed-powdery materials. The method includes causing a standard sample having known characteristics to face the sensor probe that is configured to receive reflected light from the standard sample or transmitted light through the standard sample, when the mixed-powdery materials are not present near the sensor probe while the powdery-material measurement device is in operation to deliver the mixed-powdery materials toward the equipment.

Note that a powdery material is an aggregate of minute solids and conceptually includes an aggregate of particles such as so-called "granules" and an aggregate of powder smaller than such particles. Specific examples of the powdery material include a powdery material containing a principal agent, an excipient, a binder, a disintegrant, a stabilizer, and a preservative. The powdery material according to the exemplary invention also includes a mixture of two or more types of powdery materials, and a powdery material containing the principal agent mixed with a lubricant such as magnesium stearate.

The exemplary invention enables checking or calibrating input and output properties of the sensor probe with reference to an output signal from the sensor probe obtained through measurement of the standard sample with use of the sensor probe when the mixed-powdery materials do not pass by the sensor probe with a powdery-material mixing and feeding device and an other equipment configured to execute a post process continuously in operation.

When the powdery-material measurement device includes a movable member configured to move to pass by the sensor probe, specifically, a movable member configured to capture and transfer mixed-powdery materials to be delivered toward the equipment, the standard sample is preferably disposed at the movable member in a portion facing the sensor probe. The movable member configured to push to transfer mixed-powdery materials inevitably passes by the sensor probe that can thus be checked or calibrated in terms of its properties while being passing nearby.

If the movable member has a cleaning material disposed in the portion facing the sensor probe and configured to come into contact with and wipe the sensor probe, then dust or dirt adhering to the sensor probe can be wiped away and removed as the movable member moves. The exemplary invention eventually achieves keeping high quality of the properties of the sensor probe in operation in the measurement device.

Alternatively, a nozzle, configured to discharge gas to blow and remove dust or dirt adhering to the sensor probe, may be applied.

The exemplary invention enables checking or calibrating properties of a sensor probe as needed without detaching the sensor probe from a measurement device configured to measure characteristics of mixed-powdery materials. The exemplary invention also achieves keeping high quality of the properties of the sensor probe in operation in the measurement device.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF AN EXEMPLARY EMBODIMENT

Figure 1:
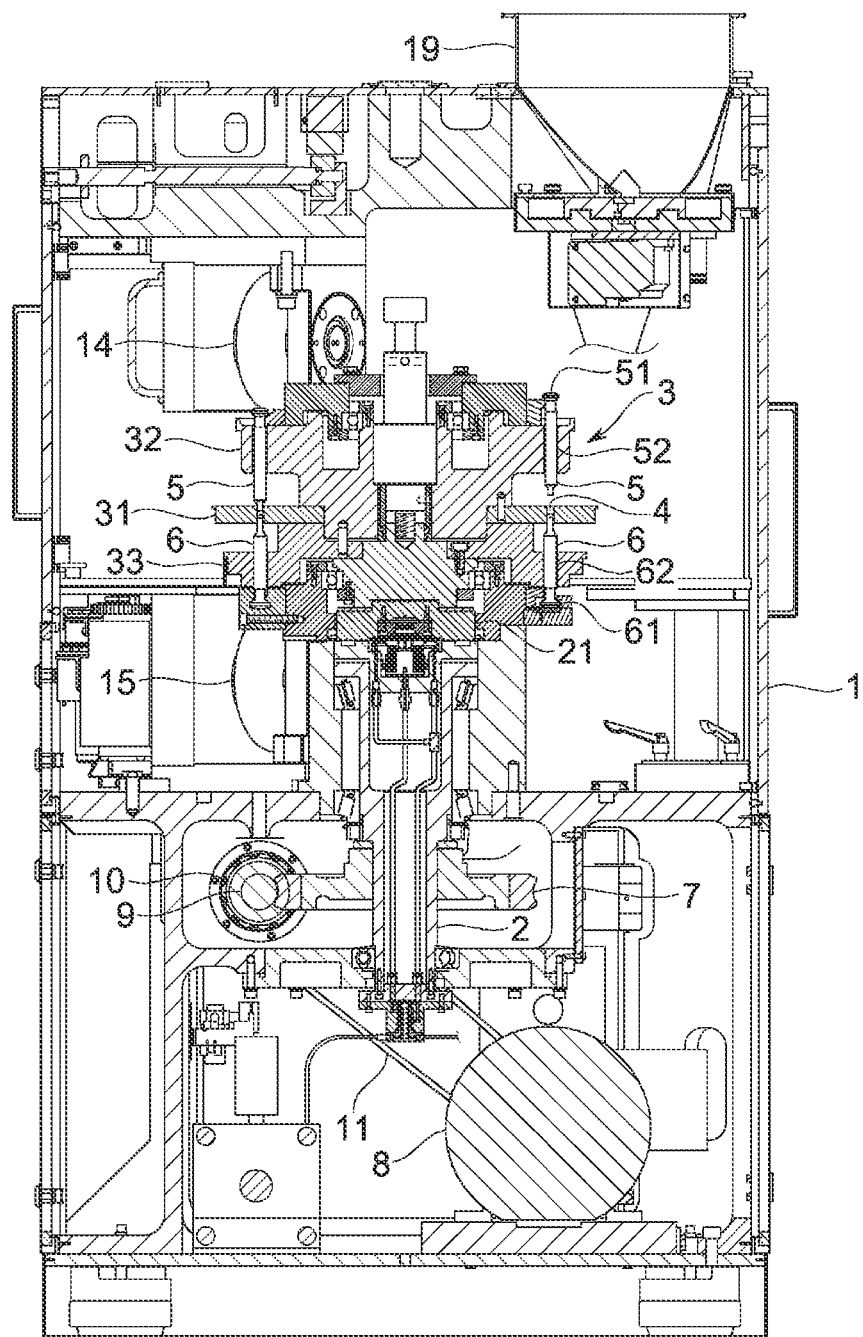
FIG. 1 is a side sectional view of a rotary compression-molding machine according to an embodiment of the exemplary invention.

An exemplary embodiment of the invention will now be described with reference to the drawings. Initially described is an overview of an entire rotary compression-molding machine (hereinafter, referred to as the "molding machine") according to the exemplary embodiment. As shown exemplarily in FIG. 1, the molding machine includes a frame 1 accommodating an upright shaft 2 that functions as a rotary shaft, and a turret 3 that is attached to a connection portion 21 disposed at the top of the upright shaft 2. A worm wheel 7 is attached to the lower end of the upright shaft 2. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to rotate the upright shaft 2 by way of the worm gear 10 and the worm wheel 7. Rotation of the upright shaft 2 causes rotation of the turret 3 and upper and lower punches 5 and 6.

Figure 2:
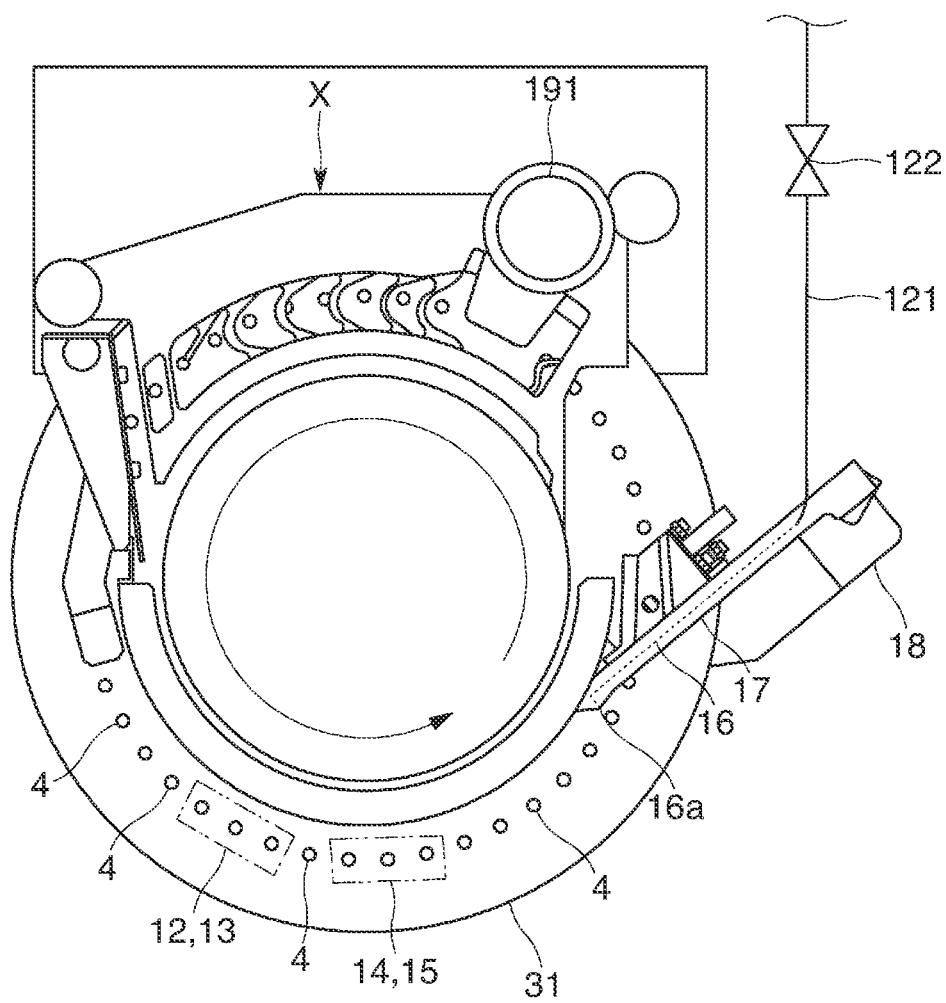
FIG. 2 is a plan view of a main part of the rotary compression-molding machine according to the exemplary embodiment.

The turret 3 horizontally rotates about the upright shaft 2, more specifically, spins. The turret 3 includes a table (e.g., die disc) 31, an upper punch-retaining portion 32, and a lower punch-retaining portion 33. As shown exemplarily in FIG. 2, the table 31 has a substantially circular disc shape, and has a plurality of die bores 4 that is disposed in an outer circumferential portion and is aligned in a direction of rotation at predetermined intervals. Each of the die bores 4 vertically penetrates the table 31. The table 31 can alternatively include a plurality of divided plates. Instead of the die bores 4 formed directly in the table 31, a die member including the die bores 4 can be attached to the table 31.

The upper and lower punches 5 and 6 are disposed above and below each of the die bores 4 and are individually vertically slidable along the die bores 4. The upper punch-retaining portion 32 retains upper punch trunks 52 while the lower punch-retaining portion 33 retains lower punch trunks 62. The upper punches 5 each have a tip 53 that enters and exits corresponding one of the die bores 4. The lower punches 6 each have a tip 63 that is kept inserted in corresponding one of the die bores 4. The upper and lower punches 5 and 6 horizontally rotate about the upright shaft 2 along with the turret 3, more specifically, revolve.

The gear shaft 9 has an end connected, via a reduction gear 124, with a rotary encoder 123 configured to detect a rotation angle and rotational speed of the gear shaft 9 as well as (the table 31, the die bores 4, and the punches 5 and 6 of) the turret 3. The rotary encoder 123 outputs a pulse signal every time the gear shaft 9 rotates by a predetermined angle. Upon receipt of a train of the pulse signals, a controller C included in a system according to the exemplary embodiment is configured to detect the rotation angle and the rotational speed of the turret 3 (i.e., find a current position of each of the die bores 4 on the table 31). Examples of the controller C shown exemplarily in FIG. 16 include a microcomputer system including a processor, a memory, an auxiliary storage device, and an input/output interface, a programmable controller, a general-purpose personal computer, and a work station. The reduction gear 124 reduces the rotational speed of the gear shaft 9 to be adapted to input speed of the rotary encoder 123 and transmits the reduced rotational speed to the rotary encoder 123.

A feeder X, functioning as a filling device, is provided to fill the die bores 4 of the turret 3 with a powdery material. The feeder X can be a gravity feeder configured to simply drop a powdery material into the die bores 4 or an agitated feeder configured to drop, into the die bores 4, a powdery material being agitated by rotating an incorporated agitating rotor. The exemplary embodiment assumes that the feeder X is the agitated feeder. The feeder X is positioned on the outer circumferential portion of the rotating table 31, particularly, just above a revolution orbit of the die bores 4. A powdery material is fed to the feeder X from a discharger M6 of a powdery-material measurement device M to be described later and a powdery material feeding pipe 191 (shown exemplarily in FIG. 4). A buffer tank 19 is provided to feed an importing port M5 of the powdery-material measurement device M with a powdery material.

Figure 3:
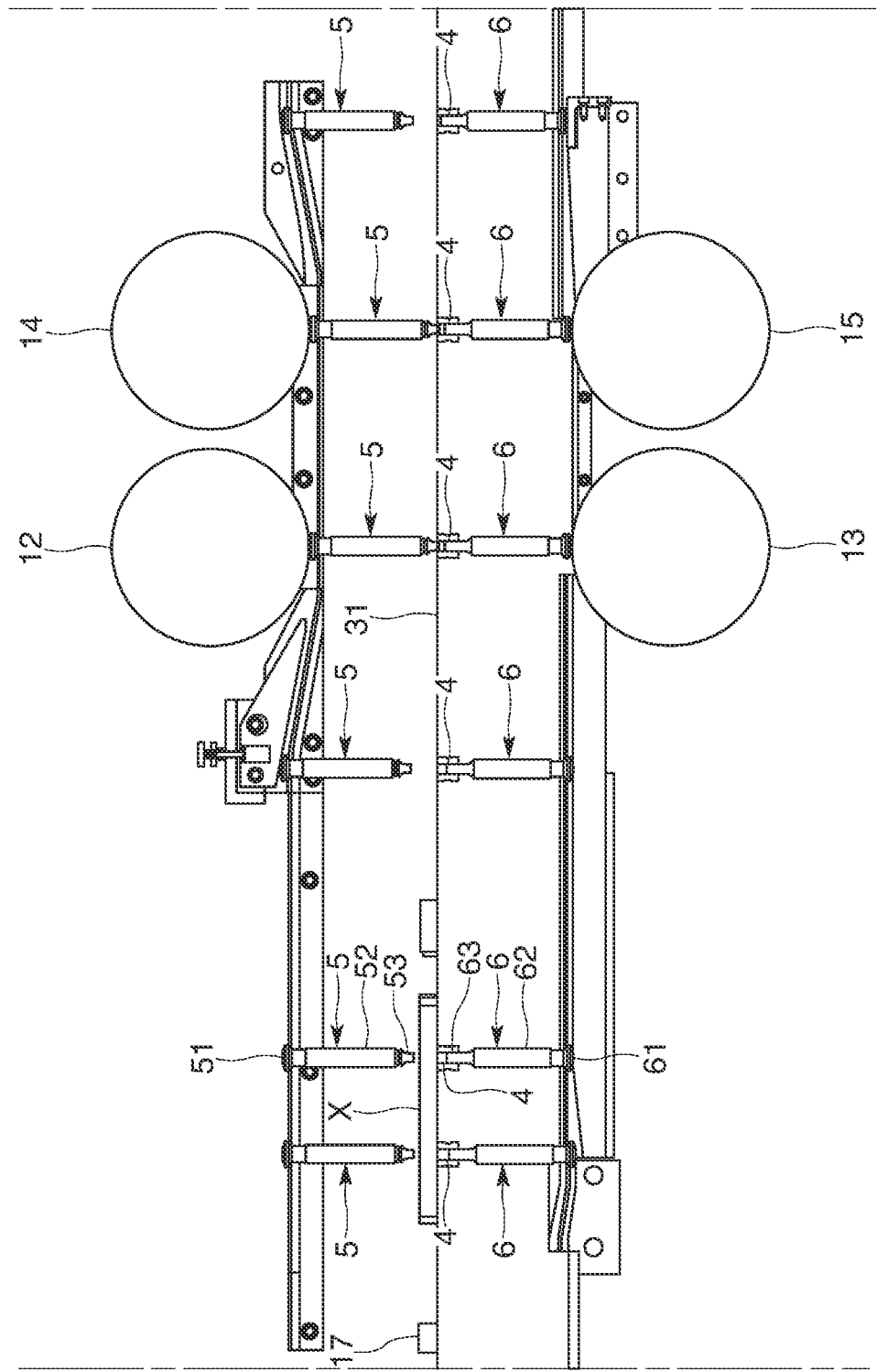
FIG. 3 is a cylindrical view of the rotary compression-molding machine according to the exemplary embodiment.

As shown exemplarily in FIG. 3, a preliminary compression upper roll 12, a preliminary compression lower roll 13, a substantial compression upper roll 14, and a substantial compression lower roll 15 are disposed on orbits of the upper and lower punches 5 and 6 that revolve about the upright shaft 2. The preliminary compression upper roll 12 and the preliminary compression lower roll 13, as well as the substantial compression upper roll 14 and the substantial compression lower roll 15, are respectively paired in the vertical direction so as to sandwich the upper and lower punches 5 and 6. The preliminary compression upper roll 12 and the substantial compression upper roll 14 each press a head 51 of each of the upper punches 5, and the preliminary compression lower roll 13 and the substantial compression lower roll 15 each press a head 61 of each of the lower punches 6. The preliminary compression upper roll 12 and the preliminary compression lower roll 13, as well as the substantial compression upper roll 14 and the substantial compression lower roll 15, bias the upper and lower punches 5 and 6 to come closer to each other, so that end surfaces of the tips 53 and 63 compress from above and below a powdery material filled in the die bores 4.

The upper and lower punches 5 and 6 have the heads 51 and 61 pressed by the rolls 12, 13, 14, and 15, and the trunks 52 and 62 smaller in diameter than the heads 51 and 61. The upper punch-retaining portion 32 of the turret 3 vertically slidably retains the trunks 52 of the upper punches 5, whereas the lower punch-retaining portion 33 vertically slidably retains the trunks 62 of the lower punches 6. The tips 53 and 63 of the trunks 52 and 62 are thinner than the remaining portions and are substantially equal in diameter to an inner diameter of the die bores 4 so as to be inserted to the die bores 4. The punches 5 and 6 revolve to cause the rolls 12, 13, 14, and 15 to come closer to the heads 51 and 61 of the punches 5 and 6. The rolls 12, 13, 14, and 15 come into contact with the heads 51 and 61 so as to step thereonto. The rolls 12, 13, 14, and 15 further press the upper punches 5 downward and press the lower punches 6 upward. While the rolls 12, 13, 14, and 15 are in contact with flat surfaces of the punches 5 and 6, the punches 5 and 6 keep applying required pressure to a powdery material in the die bores 4.

Figure 18:
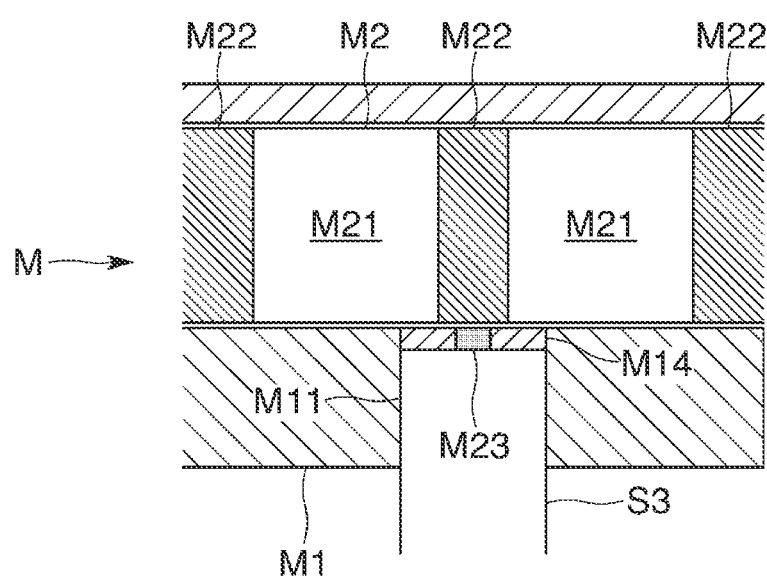
FIG. 18 is an enlarged side sectional view of part of the powdery-material measurement device according to the exemplary embodiment.

As shown exemplarily in FIG. 18, each of the upper rolls 12 and 14 of the molding machine is equipped with a load cell 120. The load cell 120 detects pressure applied to compress the powdery material in the die bores 4 by a corresponding one of the rolls 12, 13, 14, and 15 via the punches 5 and 6. The controller C according to the exemplary embodiment receives signals transmitted from the load cells 120 attached to the rolls 12 13, 14, and 15 to find magnitude of pressure applied to compress the powdery material by the preliminarily compression rolls 12 and 13 (i.e., preliminary compression pressure) and a magnitude of the pressure applied to compress the powdery material by the substantial compression rolls 14 and 15 (i.e., substantial compression pressure). The signals outputted from each of the load cells 120 form a pulse signal train having a peak when each of the pairs of punches 5 and 6 compresses the powdery material in a corresponding one of the die bores 4 with a maximum pressure. The controller C counts the number of pulse signal trains to find the number of molded products produced by the molding machine per unit time.

A molded-product collector is disposed downstream, in the direction of rotation of the turret 3 and the upper and lower punches 5 and 6, of the position where the substantial compression upper roll 14 and the substantial compression lower roll 15 apply pressure. This molded-product collector includes a guide member 17 configured to guide a molded product pushed out of each of the die bores 4. The guide member 17 extends to have a proximal end located at a molded-product collecting position 18 and a distal end located closer to the center of the table 31 than a rotation locus of the die bores 4. A molded product pushed out of each of the die bores 4 by the corresponding lower punch 6 comes into contact with the guide member 17 and moves toward the molded-product collecting position 18.

A production process of a molded product will be described briefly. As shown exemplarily in FIG. 3, the lower punch 6 initially descends and the feeder X fills, with a powdery material (i.e., mixed-powdery materials), the die bore 4 into which the tip 63 of the lower punch 6 is inserted (i.e., filling). The lower punch 6 subsequently ascends such that the die bore 4 is filled with a required amount of the powdery material (i.e., mixed-powdery materials), and the powdery material overflowing the die bore 4 is leveled.

The upper punch 5 then descends, and the preliminary compression upper roll 12 and the preliminary compression lower roll 13 press the head 51 of the upper punch 5 and the head 61 of the lower punch 6, such that the tips 53 and 63 of the punches 5 and 6 preliminarily compress the powdery material in the die bore 4. The substantial compression upper roll 14 and the substantial compression lower roll 15 sub-sequently press the head 51 of the upper punch 5 and the head 61 of the lower punch 6, such that the tips 53 and 63 of the punches 5 and 6 substantially compress the powdery material in the die bore 4 (i.e., compression molding).

The lower punch 6 then ascends until the upper end surface of the tip 63 of the lower punch 6 substantially reaches the level of the upper end of the die bore 4 (i.e., the top surface of the table 31), and pushes a molded product out of the die bore 4 onto the surface of the turret 3. The molded product pushed out of the die bore 4 is brought into contact with the guide member 17 by a rotation of the turret 3, and moves along the guide member 17 to the molded-product collecting position 18.

The molded-product collector of the molding machine according to the exemplary embodiment has a molded-product removal mechanism W configured to select a specific molded product such as a sampled product or a defective product from among molded products collected at the molded-product collecting position 18. Specifically, the guide member 17 is provided therein with an air passage 16 for a flow of pressurized air (that may be inert gas such as nitrogen or any other type of gas), and the air passage 16 has a distal end functioning as an air spray nozzle 16a opened outward in the radial direction of the turret 3. A flow passage 121 connects an air feed source (not shown) such as a pump configured to feed pressurized air and the air passage 16, and a control valve 122 is disposed on the flow passage 121 to open and close the flow passage 121. Examples of the control valve 122 include an electromagnetic solenoid configured to open in accordance with a control signal transmitted from the controller C or the like.

If the control valve 122 is opened when a specific molded product pushed out of the die bore 4 passes by the air spray nozzle 16a before contacting the guide member 17, then the air spray nozzle 16a discharges pressurized air fed from the air feed source through the flow passage 121 and the air passage 16 in the guide member 17. The discharged air blows the specific molded product outward from the table 31. The blown molded product will not reach the molded-product collecting position 18 ahead of the guide member 17. As described above, the molded-product removal mechanism W in the molding machine includes the air passages 16 and 121 for air fed from the air feed source, the spray nozzle 16a, and the control valve 122.

The molded-product removal mechanism W is also configured to sample a tableted molded product.

Described in detail below is a device configured to feed the buffer tank 19 with mixed-powdery materials, specifically, a powdery-material mixing and feeding device Z configured to deliver mixed-powdery materials toward the feeding pipe 191 directly connected to the feeder X of the molding machine. As shown exemplarily in FIG. 4, the powdery-material mixing and feeding device Z according to the exemplary embodiment includes three measuring feeders Z1 (e.g., Z1a, Z1b, and Z1c). The number of measuring feeders Z1 changes depending on the number of types of powdery materials to be mixed. The powdery-material mixing and feeding device Z can include two, or four or more measuring feeders Z1 with no particular limitation in the number thereof.

The first to third measuring feeders Z1a to Z1c according to the exemplary embodiment measure and feed different types of powdery materials. These measuring feeders Z1a to Z1c can alternatively measure and feed a single type of a powdery material. In the exemplary embodiment, the first measuring feeder Z1a, the second measuring feeder Z1b, and the third measuring feeder Z1c measure and feed a principal agent, a powdery material of an excipient like lactose, or the like, and a lubricant, respectively.

Figure 4:
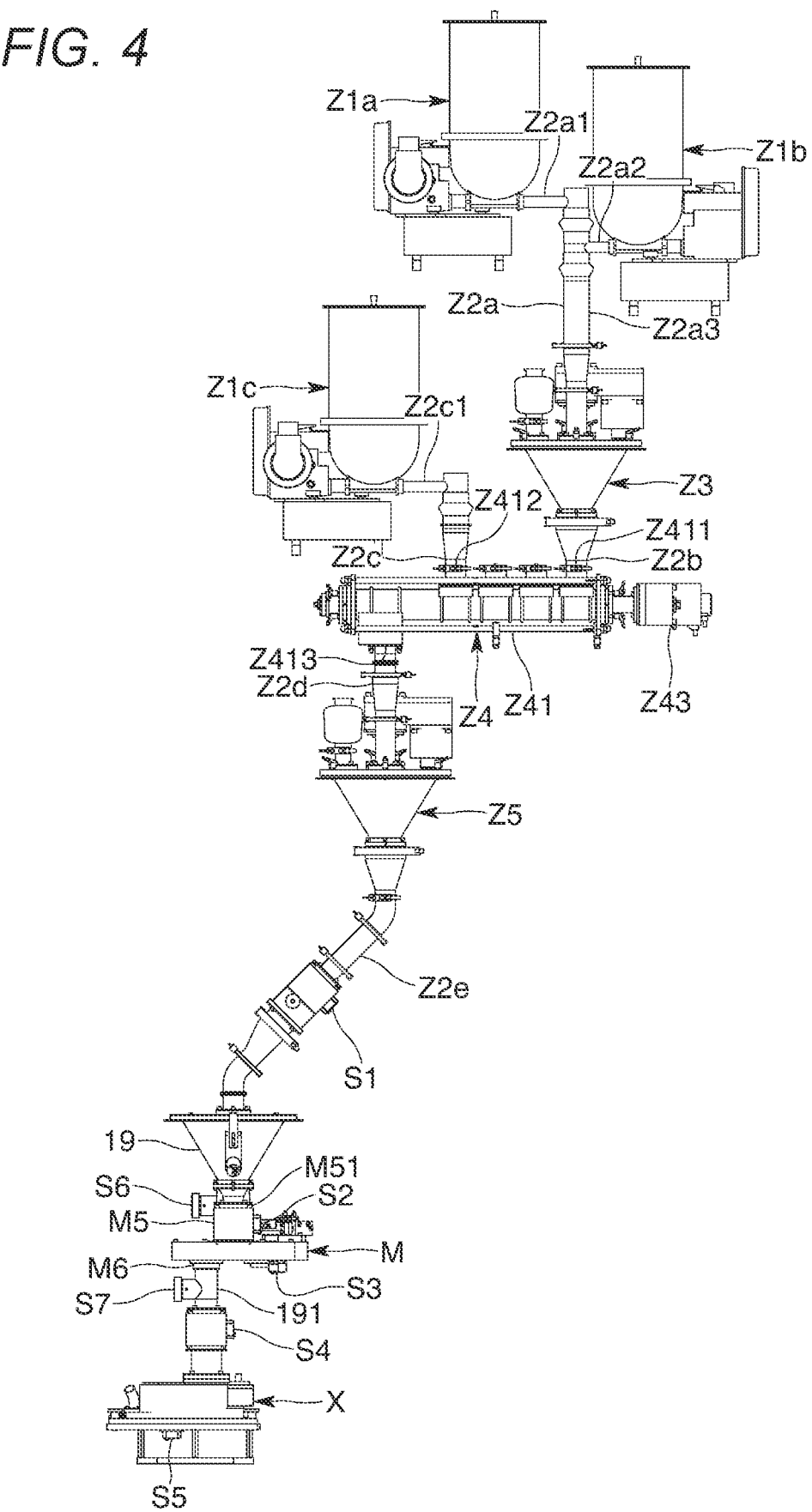
FIG. 4 is a side view of a main part of a powdery-material mixing and feeding device according to the exemplary embodiment.

As shown exemplarily in FIG. 4, the powdery-material mixing and feeding device Z includes the first measuring feeder Z1a, the second measuring feeder Z1b, a vertical mixer (i.e., a first mixer) Z3, a first connecting pipe Z2a connecting the measuring feeders Z1 (e.g., Z1a and Z1b) and the vertical mixer Z3, a horizontal mixer (i.e., a second mixer) Z4, a second connecting pipe Z2b connecting the vertical mixer Z3 and the horizontal mixer Z4, a third connecting pipe Z2c connecting the third measuring feeder Z1c and the horizontal mixer Z4, a vertical mixer (i.e., a third mixer) Z5, a fourth connecting pipe Z2d connecting the horizontal mixer Z4 and the vertical mixer Z5, and a fifth connecting pipe Z2e connecting the vertical mixer Z5 and the buffer tank 19. The measuring feeders (e.g., Z1a, Z1b, and Z1c) can be modified in terms of their disposition, shapes, and the like, and are not limited to the aspect shown exemplarily in FIG. 4.

The first measuring feeder Z1a and the second measuring feeder Z1b measure the powdery materials, namely, the principal agent and the excipient or the like, respectively, and simultaneously feed the first connecting pipe Z2a with the powdery materials. The third measuring feeder Z1c measures the powdery material, namely, the lubricant, and simultaneously feeds the third connecting pipe Z2c with the powdery material (i.e., measuring and feeding). These measuring feeders Z1 are configured in accordance with the known loss in weight system (i.e., a loss integrated value system), and each conduct feedback control of causing weight of a powdery material discharged from the feeder Z1 to be constantly measured with a gravimetric sensor, comparing to find whether or not the weight transitions to achieve a set target discharge flow rate, and increasing or decreasing a discharge rate of the feeder Z1 to reduce a difference between. Measuring the powdery materials to be fed and feeding the connecting pipes Z2a and Z2c with the powdery materials stabilizes contents of the principal agent and the like in a molded product.

As described earlier, the first connecting pipe Z2a connects the first measuring feeder Z1a and the second measuring feeder Z1b to the vertical mixer Z3, and feeds the vertical mixer Z3 with the principal agent discharged from the first measuring feeder Z1a and the excipient or the like discharged from the second measuring feeder Z1b. The second connecting pipe Z2b connects the vertical mixer Z3 and the horizontal mixer Z4, and feeds the horizontal mixer Z4 with the mixed-powdery materials of the principal agent and the excipient discharged from the vertical mixer Z3. The third connecting pipe Z2c connects the third measuring feeder Z1c and the horizontal mixer Z4, and feeds the horizontal mixer Z4 with the lubricant discharged from the third measuring feeder Z1c. The fourth connecting pipe Z2d connects the horizontal mixer Z4 and the vertical mixer Z5, and feeds the vertical mixer Z5 with the mixed-powdery materials of the principal agent, the excipient, and the lubricant discharged from the horizontal mixer Z4. The fifth connecting pipe Z2e connects the vertical mixer Z5 and the buffer tank 19, and feeds the buffer tank 19 with the mixed-powdery materials of the principal agent, the excipient, and the lubricant discharged from the vertical mixer Z5.

More specifically, the first connecting pipe Z2a includes a first branch pipe Z2a1 connected with the first measuring feeder Z1a, a second branch pipe Z2a2 connected with the second measuring feeder Z1b, and a main pipe Z2a3 connected with the first branch pipe Z2a1 and the second branch pipe Z2a2. The main pipe Z2a3 has a lower end connected with the vertical mixer Z3. The vertical mixer Z3 thus mixes the powdery materials measured and fed by the first measuring feeder Z1a and the second measuring feeder Z1b (i.e., first mixing).

As shown exemplarily in FIGS. 5 to 7, the vertical mixer Z3 functioning as the first mixer includes a lid Z36 having a feed port Z361 for a powdery material, a first case Z31 disposed below the lid Z36 and having a funnel shape, an agitation shaft Z33 disposed substantially in the center of the first case Z31 and configured to spin, an agitating rotor Z34 (i.e., first mixing member) attached to the agitation shaft Z33, a motor Z37 configured to rotate (i.e., spin) the agitation shaft Z33, a powdery-material passing member Z32 disposed below the first case Z31 and having a plurality of bores Z321, an auxiliary rotor Z35 (i.e., first mixing member) configured to facilitate a powdery material to pass through the bores Z321 of the powdery-material passing member Z32, and a second case Z38 covering the powdery-material passing member Z32. The agitating rotor Z34 and the auxiliary rotor Z35 each function as the first mixing member. The configuration according to the exemplary embodiment includes both the agitating rotor Z34 and the auxiliary rotor Z35, while the exemplary invention is also applicable to another configuration including only one of the agitating rotor Z34 and the auxiliary rotor Z35.

The agitation shaft Z33 of the vertical mixer Z3 is not necessarily disposed vertically but can be slanted. The vertical mixer Z3 has only to be configured to agitate and mix powdery materials while the powdery materials fed from the feed port Z361 are flowing downward.

The powdery materials fed through the feed port Z361 of the vertical mixer Z3 are mixed by rotation of the agitating rotor Z34 (i.e., first mixing). The powdery materials can alternatively be mixed by rotation of the auxiliary rotor Z35.

The lid Z36 includes the feed port Z361 and a shaft port Z362 allowing the agitation shaft Z33 to pass therethrough, and is shaped to cover an upper opening of the first case Z31. The lid Z36 is attached to the first case Z31 so as to prevent a powdery material from spilling or scattering from the first case Z31. The feed port Z361 of the lid Z36 is connected with the first connecting pipe Z2a. The powdery materials fed from the feed port Z361 into the first case Z31 are agitated and mixed by rotation of the agitating rotor Z34 and/or the auxiliary rotor Z35. The powdery-material passing member Z32 disposed at a reservoir Z30 has the plurality of bores Z321 through which the mixed-powdery materials pass.

Adjustment in the amount of the powdery materials fed from the feed port Z361 or increase in a rotational speed of the auxiliary rotor Z35 can cause the powdery materials fed from the feed port Z361 to be larger in amount than the powdery materials passing through the bores Z321. A certain amount of the powdery materials will thus remain in the reservoir Z30. Specifically, at least part of the powdery materials measured and fed by the first measuring feeder Z1a and the second measuring feeder Z1b remain in the reservoir Z30 in the vertical mixer Z3 (i.e., reserving) and are agitated by the auxiliary rotor Z35, to achieve improvement in mixing degree of the powdery materials. There can be included a plurality of feed ports Z361.

The first case Z31 has the open top and the powdery-material passing member Z32 is disposed below the first case Z31. The first case Z31 according to the exemplary embodiment has the substantially funnel shape, while the first case Z31 is not limited to this shape but can have any shape if it is configured to feed the powdery-material passing member Z32 with a powdery material.

The agitation shaft Z33 is disposed in the center of the first case Z31 in a planar view and is driven to rotate (i.e., spin) by the motor Z37. The agitating rotor Z34 is attached to each of the top and the center in the axial direction of the agitation shaft Z33, and the auxiliary rotor Z35 is attached to the lower end in the axial direction of the agitation shaft Z33. Rotation of the agitation shaft Z33 rotates the agitating rotors Z34 and the auxiliary rotor Z35.

The agitating rotors Z34 (i.e., first mixing members) agitate and mix the powdery materials fed from the feed port Z361 into the first case Z31. The agitating rotors Z34 can have any shape. The agitating rotors Z34 shown exemplarily in FIG. 5 have a rectangular distal end and are disposed at two positions on the agitation shaft Z33. The vertical mixer Z3 shown exemplarily in FIG. 7 is configured partially differently from the vertical mixer Z3 shown exemplarily in FIG. 5. The vertical mixer Z3 shown exemplarily in FIG. 7 includes the agitating rotor Z34 disposed at a single position on the agitation shaft Z33 and shaped differently from the agitating rotors Z34 shown exemplarily in FIG. 5. The agitating rotors Z34 are not limited in terms of their shapes or positions to those shown exemplarily in FIGS. 5 and 7.

As shown exemplarily in FIG. 6, the powdery-material passing member Z32 at the reservoir Z30 is disposed below the first case Z31 and includes the plurality of bores Z321. The powdery-material passing member Z32 is covered with the second case Z38. A powdery material passing through the bores Z321 of the powdery-material passing member Z32 is discharged from a discharge port Z381 disposed at the bottom of the second case Z38. The number and the diameter of the bores Z321 are set appropriately. Such a configuration allows powdery materials to remain at the powdery-material passing member Z32 and achieves improvement in mixing degree of the powdery materials. A powdery material passing through the bores Z321 of the powdery-material passing member Z32 in a first vertical mixer Z3a is fed to the horizontal mixer Z4 by way of the second connecting pipe Z2b.

The auxiliary rotor Z35 agitates a powdery material in the reservoir Z30. The auxiliary rotor Z35 is disposed in the center of the reservoir Z30 in a planar view and is attached to the lower end of the agitation shaft Z33. The auxiliary rotor Z35 according to the exemplary embodiment is shaped to follow the inner shape of the powdery-material passing member Z32 and facilitates a powdery material to pass through the bores Z321. The auxiliary rotor Z35 is also configured as a type of an agitating rotor.

The vertical mixer Z3 according to the exemplary embodiment includes the agitating rotor Z34. The vertical mixer Z3 can alternatively be configured by the second case Z38, the powdery-material passing member Z32, and the auxiliary rotor Z35. The second case Z38 covers the powdery-material passing member Z32, has a substantially funnel shape, and has the discharge port Z381 at the bottom. The second case Z38 guides a powdery material passing through the bores Z321 of the powdery-material passing member Z32 to the discharge port Z381.

The second connecting pipe Z2b connects the vertical mixer Z3 and the horizontal mixer Z4. The second connecting pipe Z2b is connected to the bottom of the vertical mixer Z3 and the top of the horizontal mixer Z4, and feeds the horizontal mixer Z4 with the powdery materials passing through the discharge port Z381 of the vertical mixer Z3.

Figure 24:
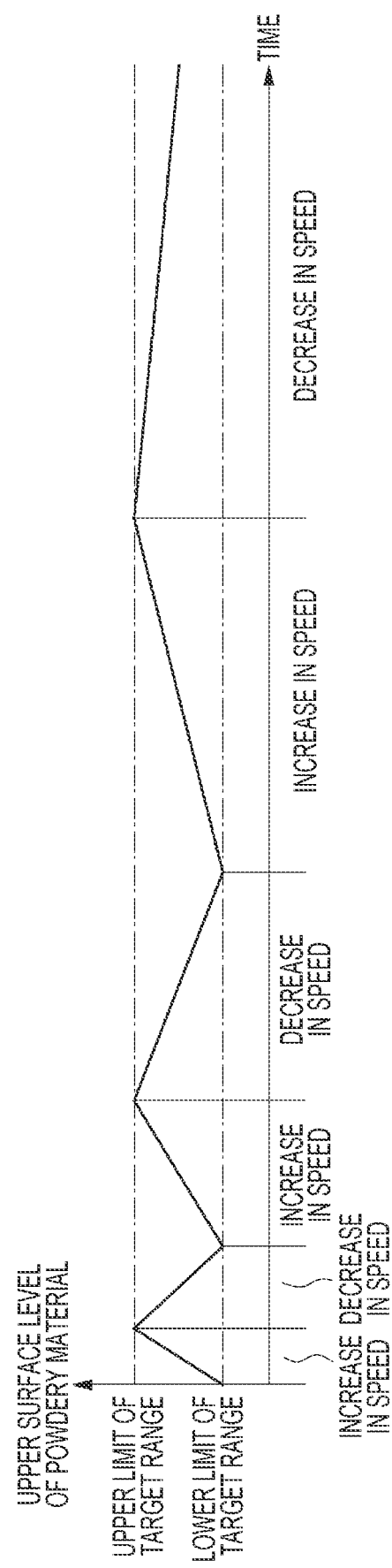
FIG. 24 is a timing chart indicating a pattern of control conducted by the control system in the compression-molding system according to the exemplary embodiment.

As shown exemplarily in FIGS. 4 and 24, the horizontal mixer Z4 functioning as the second mixer includes a cylindrical case Z41, an agitation shaft Z42 disposed substantially in the center of the case Z41 and configured to spin, a motor Z43 configured to rotate (i.e., spin) the agitation shaft Z42, and an agitating rotor Z44 attached to the agitation shaft Z42 and configured to rotate to move a powdery material substantially horizontally. The horizontal mixer Z4 mixes the fed powdery materials, namely, the principal agent and the excipient or the like with the lubricant (i.e., second mixing). The case Z41 according to the exemplary embodiment does not rotate (i.e., spin), but can alternatively be configured to rotate. This may achieve further improvement in mixing degree of the powdery materials.

The case Z41 has a top including a plurality of feed ports that allows powdery materials to be fed into the case Z41, and a discharge port Z413 that allows mixed-powdery materials to be discharged from the case Z41. The configuration according to the exemplary embodiment includes two feed ports (e.g., first and second feed ports Z411 and Z412), and the second connecting pipe Z2b is connected to the first feed port Z411 of the case Z41 of the horizontal mixer Z4. The first feed port Z411 feeds the case Z41 with the mixed-powdery materials of the principal agent and the excipient or the like. The agitating rotor Z44 rotates to move the mixed-powdery materials fed into the case Z41 toward the discharge port Z413 of the case Z41. The second feed port Z412 feeds the lubricant from the third connecting pipe Z2c. The agitation shaft Z42 and the agitating rotor Z44 rotate to move the lubricant fed into the case Z41 toward the discharge port Z413 of the case Z41. Any of the feed ports not in use will be closed by a lid.

The discharge port Z413 is disposed at the bottom of the case Z41. The discharge port Z413 is connected with the fourth connecting pipe Z2d. The agitating rotor Z44 rotates to discharge the mixed-powdery materials from the case Z41 through the discharge port Z413 to the fourth connecting pipe Z2d.

Figure 8:
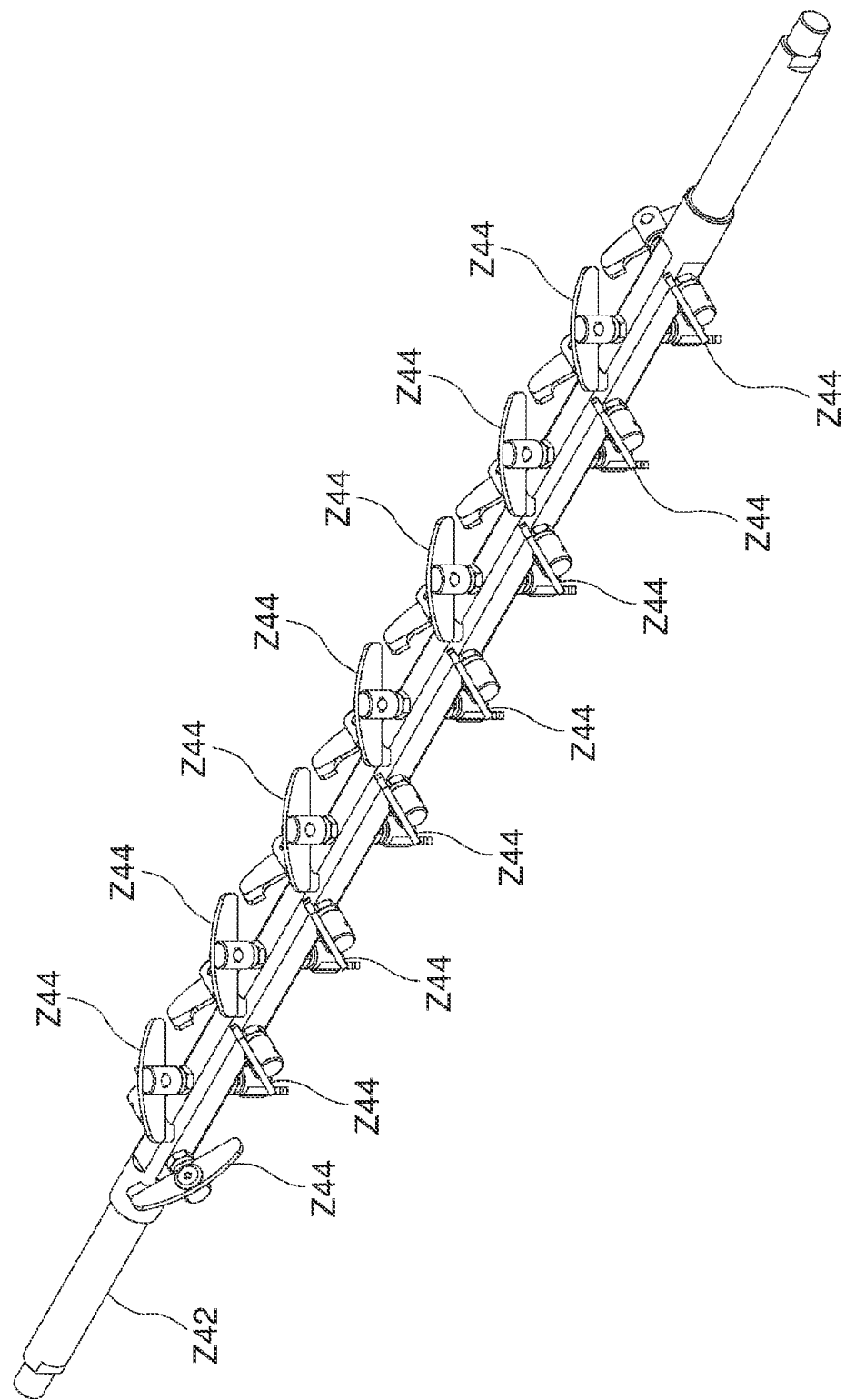
FIG. 8 is a perspective view of an agitation shaft and an agitating rotor (e.g., second mixing member) of a horizontal mixer included in the powdery-material mixing and feeding device according to the exemplary embodiment.

The agitation shaft Z42 extends in a longitudinal direction of the case Z41 and is disposed substantially in the center in a sectional view. The agitation shaft Z42 is driven to rotate (i.e., spin) by the motor Z43. As shown exemplarily in FIG. 8, the agitating rotor Z44 is attached to the agitation shaft Z42. Rotation of the agitation shaft Z42 causes rotation of the agitating rotor Z44 to simultaneously mix and move the powdery materials toward the discharge port Z413.

The agitating rotor Z44 is configured to agitate and mix the powdery materials fed into the case Z41 through the feed ports (e.g., Z411 and Z412). The agitating rotor Z44 can have any shape, but is preferably configured to simultaneously mix and move the powdery materials toward the discharge port Z413. As shown exemplarily in FIG. 8, the agitating rotor Z44 according to the exemplary embodiment is shaped to have expanded both ends, is attached to the agitation shaft Z42 at a freely adjustable angle.

The third measuring feeder Z1c is configured to measure and feed a lubricant to the horizontal mixer Z4. The third connecting pipe Z2c is connected to the bottom of the third measuring feeder Z1c. The lubricant in the third measuring feeder Z1c is fed to the horizontal mixer Z4 through the third connecting pipe Z2c (i.e., lubricant feeding). The lubricant can alternatively be fed to the horizontal mixer Z4 by a μR feeder (e.g., manufactured by Nisshin Engineering Inc.). The lubricant can still alternatively be fed to the horizontal mixer Z4 by an atomizer (i.e., spray device).

The third connecting pipe Z2c includes a branch pipe Z2c1 and a main pipe Z2c2. The branch pipe Z2c1 has a first end connected to the bottom of the third measuring feeder Z1c, and a second end connected to the main pipe Z2c2. The lower end of the main pipe Z2c2 is connected to the second feed port Z412 of the horizontal mixer Z4.

The fourth connecting pipe Z2d connects the horizontal mixer Z4 and the vertical mixer Z5. The fourth connecting pipe Z2d is connected to the bottom of the horizontal mixer Z4 and the top of the vertical mixer Z5, and feeds the vertical mixer Z5 with the powdery materials passing through the discharge port Z413 of the horizontal mixer Z4.

Figure 5:
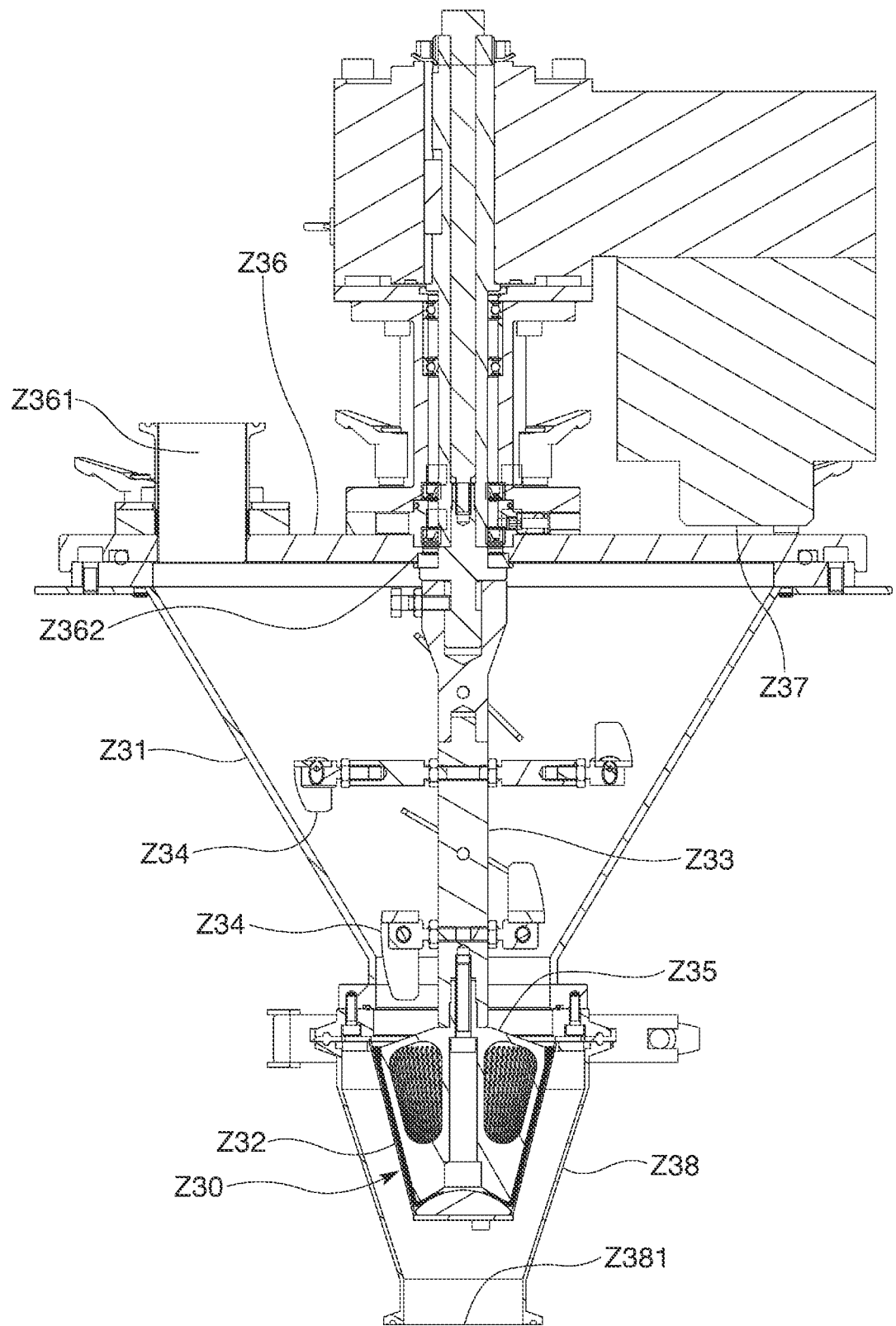
FIG. 5 is a side sectional view of a vertical mixer included in the powdery-material mixing and feeding device according to the exemplary embodiment.
Figure 6:
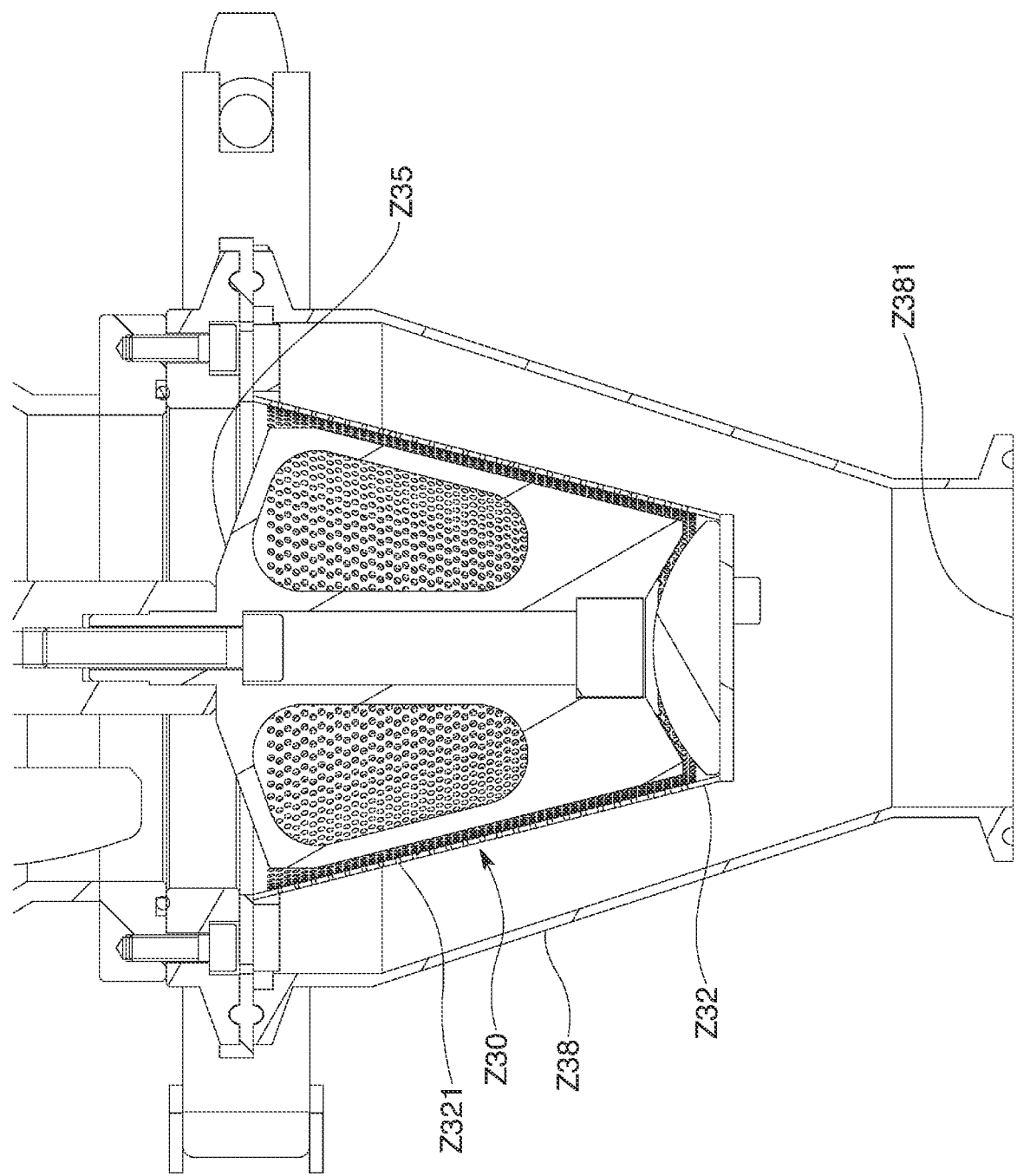
FIG. 6 is an enlarged side sectional view of a main part of the vertical mixer according to the exemplary embodiment.
Figure 7:
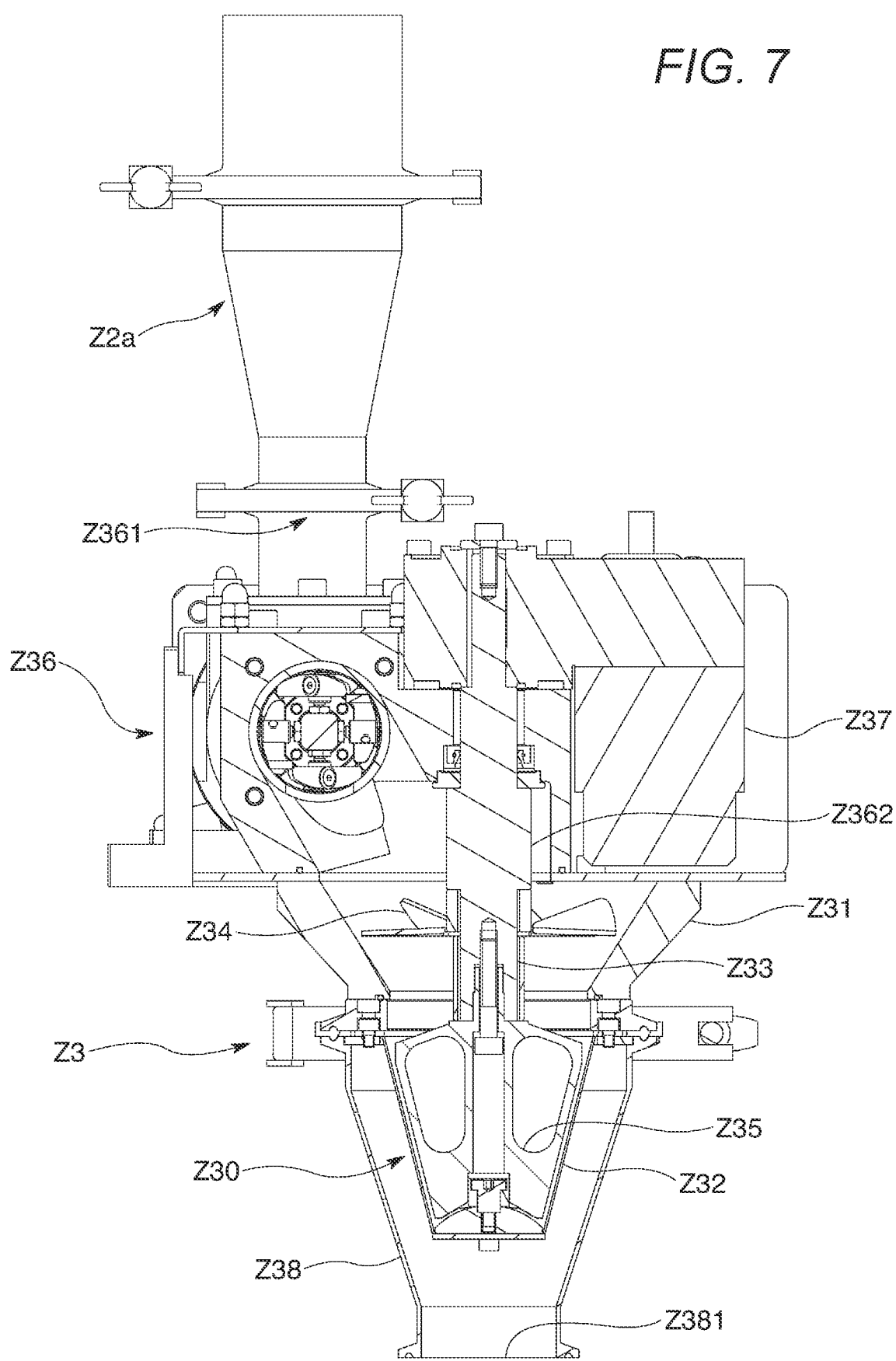
FIG. 7 is a side sectional view of another exemplary vertical mixer.

The vertical mixer Z5, functioning as the third mixer, can be configured similarly to the vertical mixer Z3 shown exemplarily in FIGS. 5 to 7. Thus, the vertical mixer Z5 will not be described herein. The fourth connecting pipe Z2d has an upper end connected with the discharge port Z413 of the horizontal mixer Z4 and a lower end connected with the feed port of the vertical mixer Z5. The vertical mixer Z5 has an agitating rotor and an auxiliary rotor attached to an agitation shaft disposed vertically or slanted from the vertical direction. The agitating rotor and the auxiliary rotor each function as a third mixing member. The powdery materials, fed to the feed port of the vertical mixer Z5 through the fourth connecting pipe Z2d, are mixed by the agitating rotor and the auxiliary rotor rotating along with the agitation shaft (third mixing).

The fifth connecting pipe Z2e has an upper end connected with a discharge port of the vertical mixer Z5 and a lower end connected with the feed port Z361 of the buffer tank 19. The powdery materials mixed by the vertical mixer Z5 are fed from the discharge port of the vertical mixer Z5 to the buffer tank 19 through the fifth connecting pipe Z2e.

The bottom of the buffer tank 19 is connected to the compression-molding machine. The mixed-powdery materials, passing through the buffer tank 19, are fed to the feeder X in the compression-molding machine and are eventually compression molded in the die bores 4.

The characteristics, specifically the mixing degree, of the mixed-powdery materials delivered from the buffer tank 19 of the powdery-material mixing and feeding device Z toward the compression-molding machine is thus measured at the powdery-material mixing degree measurement device M included in the powdery-material mixing and feeding device Z and each site other than the mixing degree measurement device M. If the mixing degree or any of other characteristics is out of a predetermined range, then there is executed processing of removing such defective mixed-powdery materials, issuing alarm sound, stopping the device, or the like. The powdery-material mixing degree measurement device M promptly measures the characteristics of the powdery materials mixed by the powdery-material mixing and feeding device Z and operates appropriately.

Examples of a method of measuring a mixing degree or any of other characteristics of mixed-powdery materials include Raman spectroscopy, infrared spectroscopy, X-ray diffraction, X-ray transmission measurement, and high performance liquid chromatography (HPLC). Any one of these methods is applicable if the mixing degree or the like of the mixed-powdery materials is promptly measured. The exemplary embodiment mainly adopts near infrared reflectance (NIR), or a near infrared absorption spectrum method. Specifically, in order to evaluate an amount or a percentage (i.e., ratio) of the principal agent in the mixed-powdery materials (i.e., uniformity of the mixed-powdery materials) (whether or not the mixed-powdery materials are segregated), the mixed-powdery materials moving from the powdery-material mixing and feeding device Z toward the feeder X of the compression-molding machine are irradiated with near infrared light to measure light absorption and reflection (i.e., scatter) for qualitative and quantitative analyses of a concentration and the like of the principal agent based on a spectrum thereof. These analyses are repeatedly conducted at predetermined cycles. A measured wavelength falls in a wavelength range including a unique absorption peak of the principal agent and no peak of the excipient or the lubricant. The near infrared reflectance also achieves measurement of particle diameters of the mixed-powdery materials.

The exemplary embodiment adopts a near infrared sensor as a process analytical technology (PAT) sensor configured to measure a mixing degree and the like of powdery materials. As shown exemplarily in FIG. 4, the configuration according to the exemplary embodiment includes a first sensor S1 of a near infrared sensor configured to initially measure the mixing degree or the like of the mixed-powdery materials before being reserved in the buffer tank 19.

The powdery materials mixed by the powdery-material mixing and feeding device Z are temporarily reserved in the buffer tank 19 as a reservoir after the first sensor S1 measures the mixing degree or the like of the powdery materials. The powdery materials reserved in the buffer tank 19 are fed to the powdery-material measurement device M after a near infrared sensor S2 measures the mixing degree or the like of the powdery materials again. The mixed-powdery materials can optionally be further agitated and mixed in the buffer tank 19.

Figure 9:
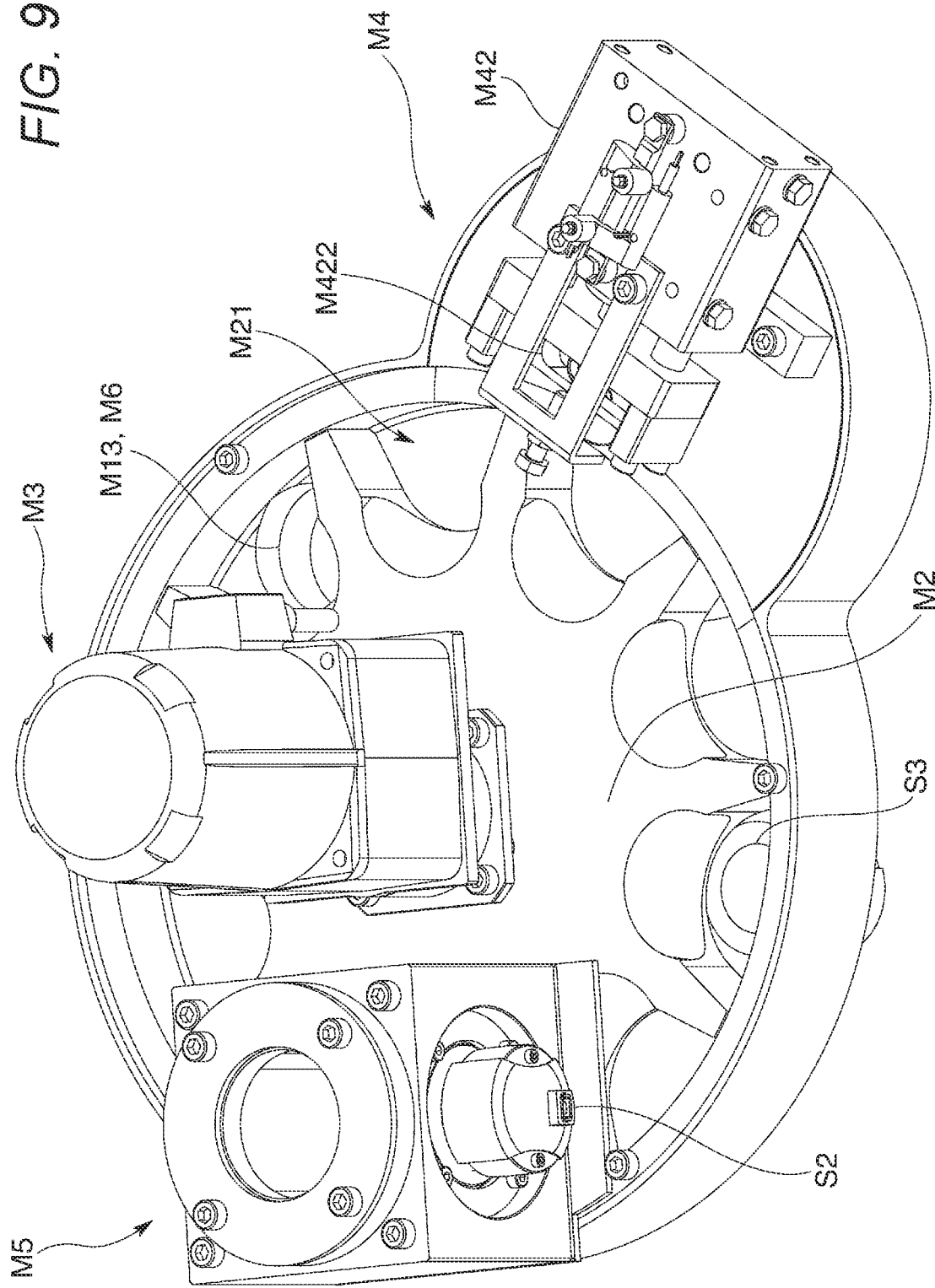
FIG. 9 is a perspective view of a main part of a powdery-material measurement device according to the exemplary embodiment.
Figure 10:
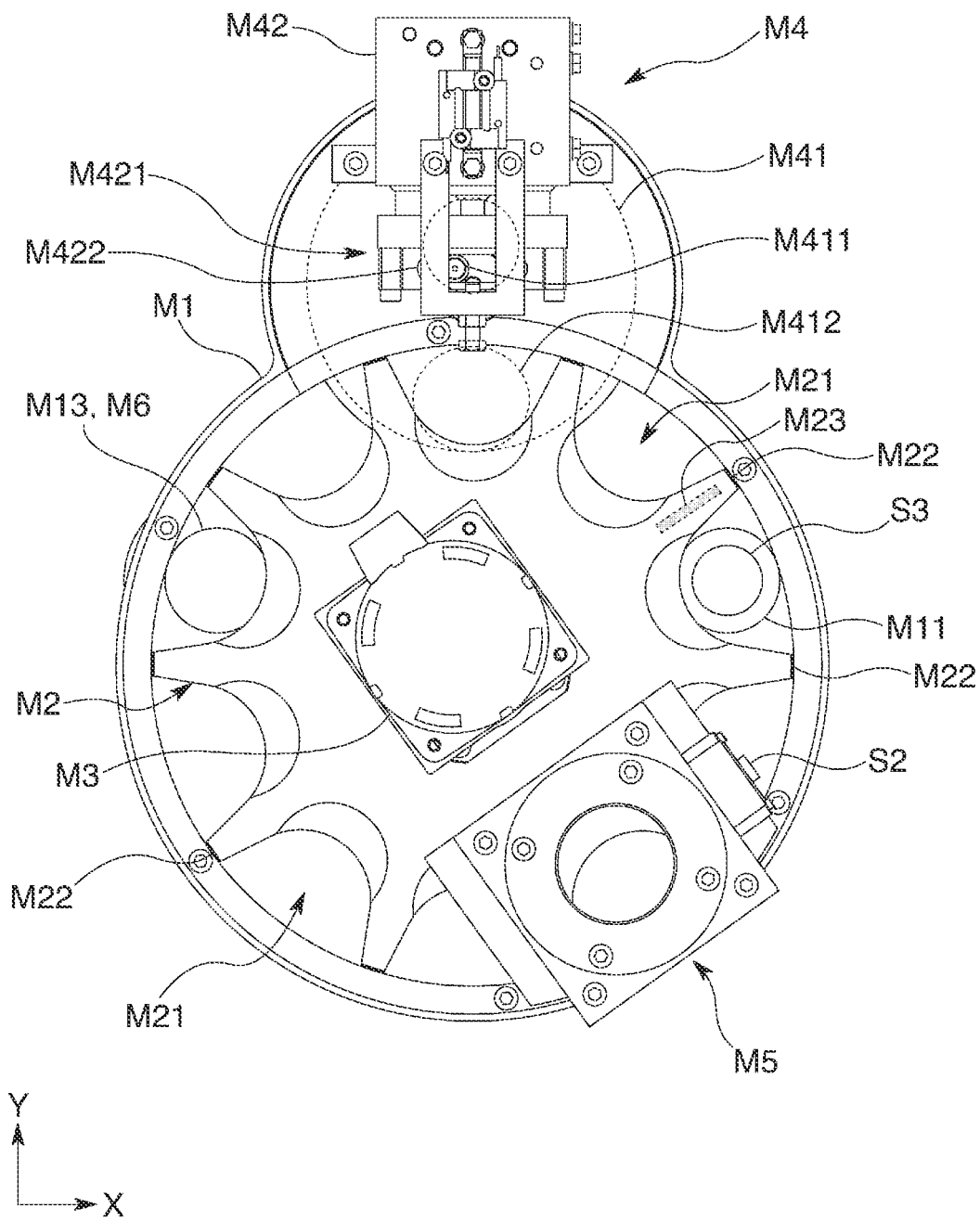
FIG. 10 is a plan view of the main part of the powdery-material measurement device according to the exemplary embodiment.

As shown exemplarily in FIGS. 9 and 10, the powdery-material measurement device M includes a case M1, a rotator M2 functioning as a movable member accommodated in the case M1 and configured to capture and transfer mixed-powdery materials, a servo motor or a stepping motor M3 functioning as a driver for the rotator M2, near infrared sensors S2 and S3 configured to measure characteristics, especially, a mixing degree, of the mixed-powdery materials, a powdery-material remover M4 configured to remove mixed-powdery materials having defective characteristics, the feeding port M5 configured to introduce the mixed-powdery materials from the buffer tank 19 into the case M1, and the discharger M6 configured to discharge the mixed-powdery materials to the agitated feeder X functioning as a filler of the molding machine.

Figure 11:
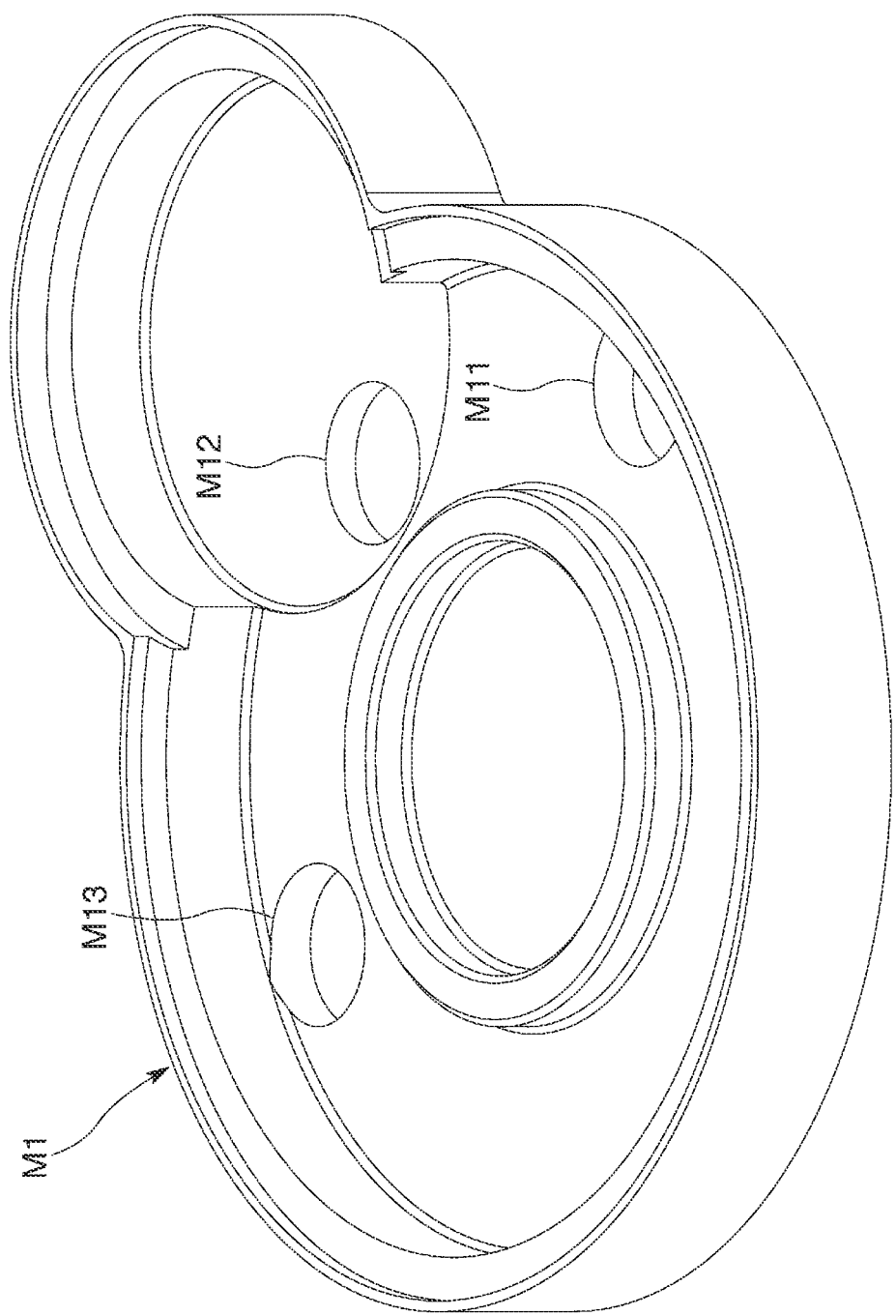
FIG. 11 is a perspective view of a case of the powdery-material measurement device according to the exemplary embodiment.
Figure 12:
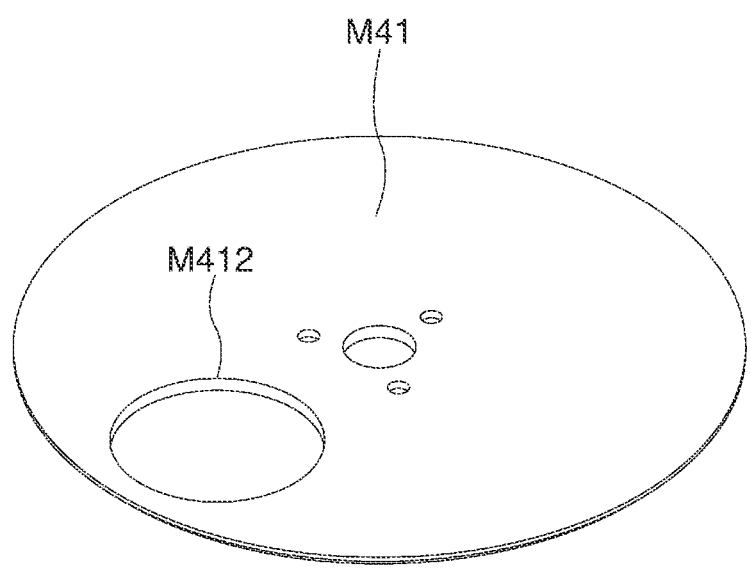
FIG. 12 is a perspective view of a drive body of the powdery-material measurement device according to the exemplary embodiment.
Figure 13:
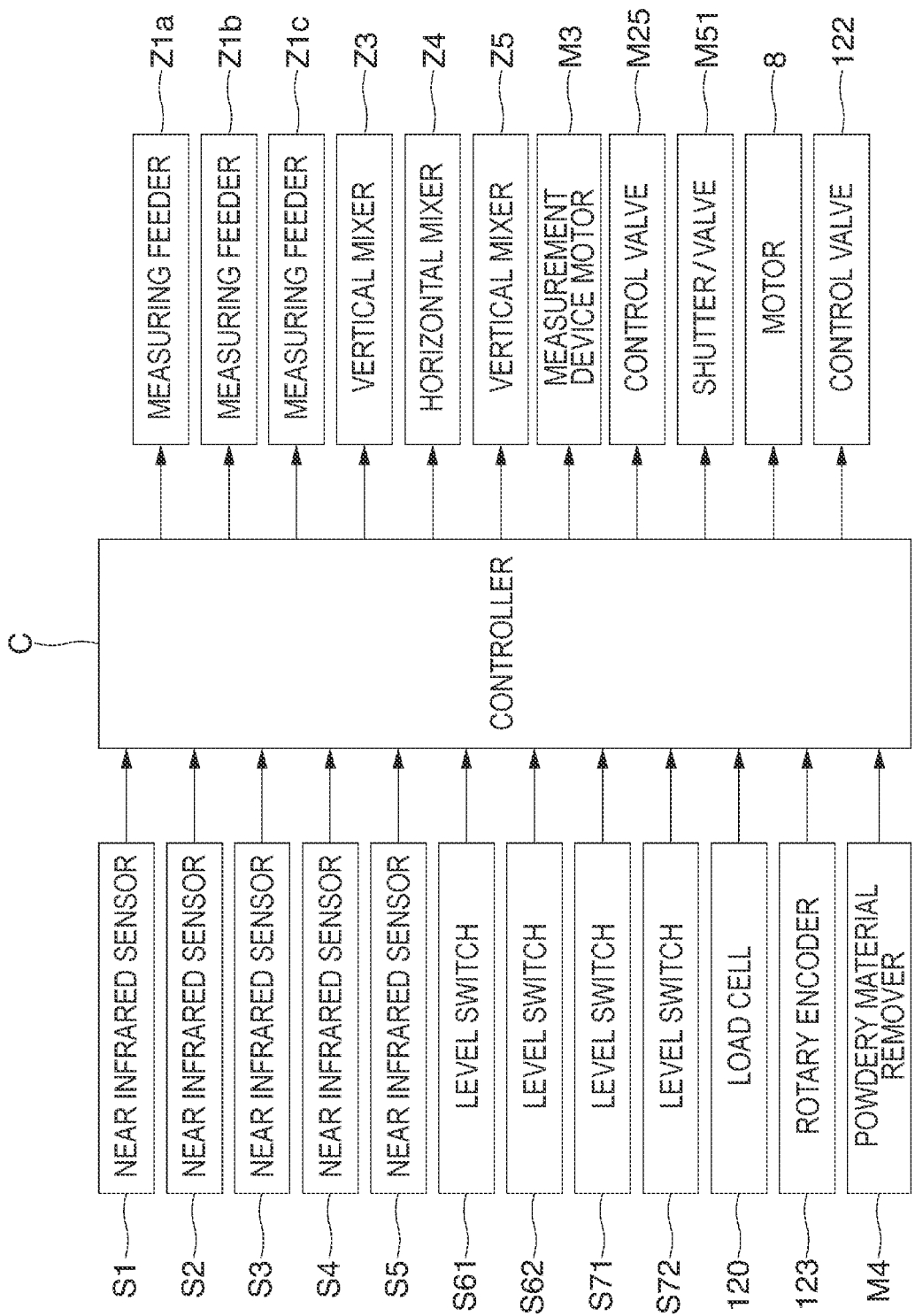
FIG. 13 is a block diagram of a control system in a compression-molding system according to the exemplary embodiment.

As shown exemplarily in FIG. 11, the case M1 has a bottom surface including an attachment bore M11 allowing the near infrared sensor S3 to be mounted therein, a removal bore M12 allowing defective mixed-powdery materials to fall thereinto and be removed, and a discharge bore M13 allowing normal mixed-powdery materials to be discharged to the powdery material feeding pipe 191 connected to the feeder X of the molding machine. The removal bore M12 is positioned at the powdery-material remover M4, and the discharge bore M13 is positioned at the discharger M6. The case M1 has a top having the importing port M5 configured to feed the case M1 with a powdery material. The mixed-powdery materials enter the case M1 by way of the buffer tank 19 and the importing port M5. The importing port M5 has the second sensor S2 of a near infrared sensor configured to measure characteristics such as the mixing degree of the mixed-powdery materials passing through the importing port M5.

The rotator M2 includes a plurality of blades M22 extending radially in a planar view, and the blades M22 interpose spaces serving as movable portions M21 each having a pocket-like shape. The plurality of movable portions M21 is intermittently disposed in a rotation direction or a circumferential direction of the rotator M2, and is each configured to capture mixed-powdery materials fed from the importing port M5. The rotator M2 is driven to horizontally turn by the motor M3 positioned above the rotator M2. Along with rotation of the rotator M2, the mixed-powdery materials captured by the movable portions M21 are pushed by the blades M22 to be transferred.

The third sensor S3 of a near infrared sensor is attached to the attachment bore M11 of the case M1 and is configured to measure characteristics such as the mixing degree of the powdery materials fed to the movable portions M21 and captured by the movable portions M21. The motor M3 and the rotator M2 may temporarily stop rotation when the third sensor S3 measures the mixing degree or the like of the powdery materials captured by the movable portions M21 (i.e., the rotator M2 rotates intermittently in some cases). When the sensors S1, S2, and S4 measure the mixing degree and the like of powdery materials actually flowing in a pipe, the sensors may have unstable measurement values. When the sensor S3 measures with the powdery materials captured by the rotator M2 and the movable portions M21 not in motion as well as the powdery materials in the movable portions M21 have stabilized density, the characteristics such as the mixing degree of the powdery materials can be measured quite accurately.

The powdery-material remover M4 includes a case, a drive body M41 functioning as a shutter, and a driver M42 configured to drive the drive body M41. The case of the powdery-material remover M4 is provided integrally with the case M1. The drive body M41 according to the exemplary embodiment has a circular disc shape, and includes a center projection M411 engaged with the driver M42, and a partial cutoff portion M412. The driver M42 has a distal end M421 configured to drive forward and backward along a Y axis indicated in FIG. 10, and an engagement bore M422 disposed at the distal end and engaged with the projection M411 of the drive body M41.

In a state where the distal end M421 of the driver M42 moves in a positive direction along the Y axis as indicated in FIG. 10, the cutoff portion M412 of the drive body M41 is located in the center of the removal bore M12 of the case M1. In another state where the distal end M421 moves in a negative direction along the Y axis, the cutoff portion M412 is spaced apart from the removal bore M12 of the case M1.

Specifically, in the case where the driver M42 drives to move the distal end M421 in the negative direction along the Y axis, the drive body M41 is driven clockwise together therewith and the cutoff portion M412 is not overlapped with the removal bore M12. This state thus prevents removal of the powdery materials in the movable portions M21 of the rotator M2. In the other case where the driver M42 drives to move the distal end M421 in the positive direction along the Y axis, the drive body M41 is driven counterclockwise together therewith, and the cutoff portion M412 is overlapped with the removal bore M12. This state then leads to removal of the powdery materials in the movable portions M21 of the rotator M2.

The drive body M41 according to the exemplary embodiment is driven clockwise and counterclockwise to remove the powdery material in the movable portions M21 of the rotator M2. The drive body M41 can alternatively be configured to rotate only in one direction to remove the powdery material in the movable portions M21.

If the mixing degree of the powdery materials measured with any of the first to third sensors S1 to S3 (i.e., the amount or the percentage (i.e., ratio) of the principal agent in the mixed-powdery materials), is out of the predetermined range, then the powdery-material remover M4 removes the mixed-powdery materials in the movable portions M21. The mixed-powdery materials in the movable portions M21 can alternatively be removed if all mixing degree measurement values of the first to third sensors S1 to S3 are out of the predetermined range, or if the measurement value of any one of the sensors S is out of the predetermined range.

The powdery-material remover M4 is also configured to sample the mixed-powdery materials.

The mixed-powdery materials not removed by the powdery-material remover M4 reach the discharger M6 and pass through the discharge bore M13 to reach the powdery-material feeding pipe 191.

The third sensor S3 of the powdery-material measurement device M will be additionally described below. The third sensor S3 causes a sensor probe to irradiate, with a light wave (or an electromagnetic wave), mixed-powdery materials being transferred from the importing port M5 to the discharger M6 (the discharge bore M13) in the powdery-material measurement device M and receive reflected light (i.e., a reflected wave) at the powdery materials or transmitted light (i.e., a transmitted wave) through the powdery materials to measure a spectrum thereof. The third sensor S3 according to the exemplary embodiment is assumed to be a reflection near infrared sensor. Specifically, the sensor probe S3 irradiates, with near infrared light, mixed-powdery materials captured and transferred by the movable portions M21 of the rotator M2, and receives reflected light from the mixed-powdery materials.

The sensor probe S3 is positioned vertically below a transfer passage of mixed-powdery materials, and is directed upward to face, from below, the flowing mixed-powdery materials (i.e., mixed-powdery materials to be measured pass vertically above the sensor probe S3). Accordingly, dust or dirt generated or not generated from the powdery materials may adhere to the sensor probe S3. The dust or dirt causes noise to mix with the spectrum of the reflected light from the mixed-powdery materials to be measured and originally received by the sensor probe S3.

Without such influence of the dust or dirt, chronological state change of the sensor probe S3 can cause change of input and output properties of the sensor probe S3 (i.e., relation between characteristics of the mixed-powdery material to be measured and a signal outputted from the sensor probe S3 having measured the characteristics). It is thus necessary to check or calibrate the input and output properties of the sensor probe S3 as needed.

Figure 14:
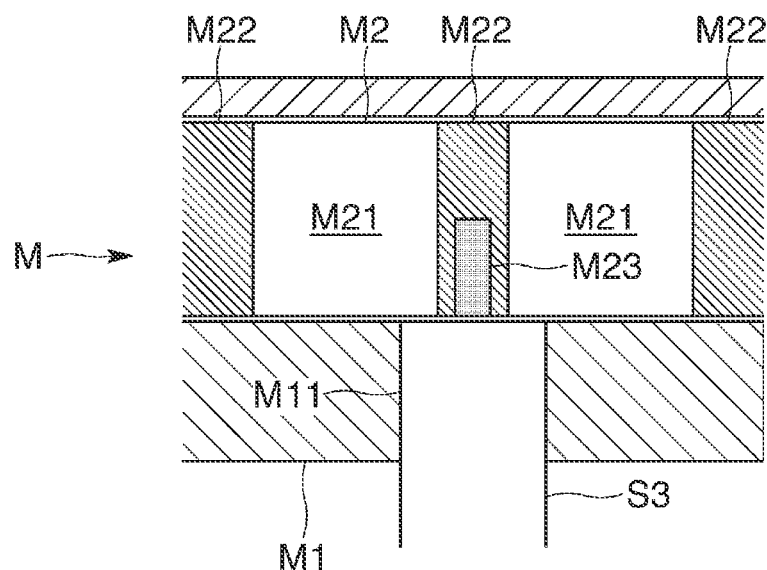
FIG. 14 is an enlarged side sectional view of part of the powdery-material measurement device according to the exemplary embodiment.

The powdery-material measurement device M according to the exemplary embodiment achieves checking or calibrating the input and output properties of the sensor probe S3 while being kept attached to the attachment bore M11 of the case M1 without being detached from the case M1. As shown exemplarily in FIGS. 10 and 14, any of the blades M22 of the rotator M2 preliminarily includes a standard sample (i.e., reference piece) M23 for calibration of the sensor probe S3. The standard sample M23 encloses standard (i.e., reference) powdery materials have known characteristics that include a mixing degree and are kept constant. FIG. 14 exemplifies a configuration in which any of the blades M22 has a downward surface having an upward recess allowing the standard sample M23 to be buried therein. The standard sample M23 has only to be disposed in at least one of the blades M22 of the rotator M2, or may alternatively be disposed in each of a plurality of blades M22.

The blades M22 of the rotator M2, along with powdery materials captured by the movable portions M21, pass vertically above the sensor probe S3. Each of the blades M22 is interposed between the movable portions M21 adjacent to each other and separates the movable portions M21. The rotator M2 rotates to cause mixed-powdery materials to intermittently pass by the sensor probe S3. When there are no mixed-powdery materials near (e.g., adjacent) the probe S3 or when the blade M22 passes, the standard sample M23 disposed in the downward surface facing the probe S3, of the blade M22, passes by the probe S3. The sensor probe S3 irradiates the standard sample M23 with near infrared light and receives reflected light at the standard sample M23. The motor M3 and the rotator M2 may temporarily stop rotation when the third sensor S3 measures the standard sample M23 positioned at the blade M22.

The standard sample M23 has the known and constant characteristics, so that it is obviously possible to predict an original spectrum of the reflected light from the standard sample M23 as well as an original signal to be outputted from the sensor probe S3 having received the reflected light. The controller C can thus check the input and output properties of the sensor probe S3 through comparison between a standard output signal, from the sensor probe S3, corresponding to the original spectrum, and an actual output signal from the sensor probe S3 having received the reflected light at the standard sample M23.

Figure 19:
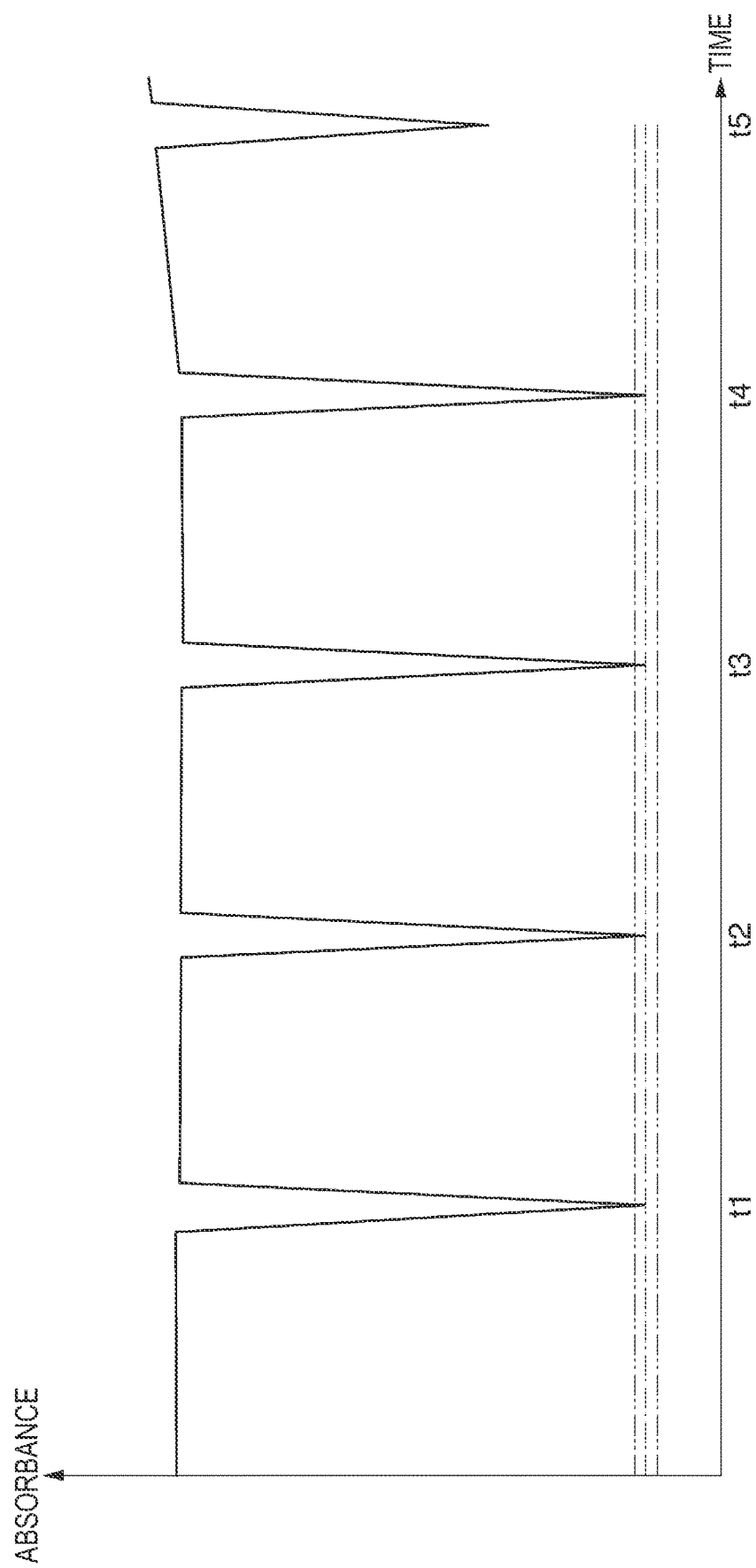
FIG. 19 is a graph indicating a specific example of a measurement result of a sensor probe included in the powdery-material measurement device according to the exemplary embodiment.

FIG. 19 indicates a specifically exemplary measurement result of the sensor probe S3. FIG. 19 has a transverse axis indicating time (i.e., a period) and an ordinate axis indicating absorbance of a measurement target, obtained in accordance with an output signal from the sensor probe S3 having received reflected light. FIG. 19 includes time t1 to t5, and at each timing, the standard sample M23 passes near (e.g., adjacent) or vertically above the probe S3 and reflected light from the standard sample M23 enters the prove S3. FIG. 19 includes a dashed line indicating absorbance of the standard sample M23, and two-dot chain lines indicating an upper limit and a lower limit of an appropriate range of measurement results.

In a case where the output signal from the sensor probe S3, having measured the standard sample M23, is within a desired range, or if a difference between original output from the sensor probe S3 and actual output is equal to or less than a certain value, the sensor probe S3 currently has appropriate input and output properties. In FIG. 19, a measurement result of absorbance of the standard sample M23 is within the appropriate range at each of the time t1 to t4. The sensor probe S3 accordingly has appropriate input and output properties in this case.

In another case where the output signal from the sensor probe S3, having measured the standard sample M23, is out of the desired range, or if the difference between the original output from the sensor probe S3 and the actual output is more than the certain value, the sensor probe S3 currently has inappropriate input and output properties. In FIG. 19, a measurement result of absorbance of the standard sample M23 is out of the appropriate range at the time t5. The sensor probe S3 accordingly has inappropriate input and output properties in this case.

The controller C having determined that the sensor probe S3 currently has inappropriate properties issues alarm sound, lights or flashes a lamp, stops the powdery-material mixing and feeding device Z and/or the molding machine, or the like to notify such determination and urge cleaning, replacement, or the like of the sensor probe S3. The controller C may alternatively change a calibration curve used for measurement of the characteristics such as the mixing degree of mixed-powdery materials to be adapted to the current properties of the sensor probe S3.

Figure 15:
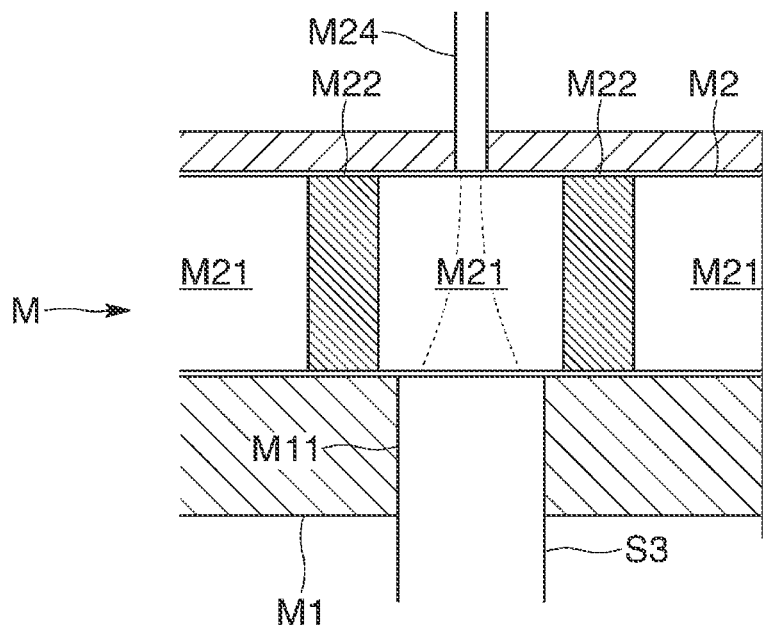
FIG. 15 is an enlarged side sectional view of part of the powdery-material measurement device according to the exemplary embodiment.

When the controller C determines that the sensor probe S3 currently has inappropriate properties, the probe S3 may be configured to be cleaned automatically. As shown exemplarily in FIG. 15, the case M1 of the powdery-material measurement device M may accommodate a nozzle M24 configured to discharge pressurized air (that may be inert gas such as nitrogen or any other type of gas) toward the sensor probe S3. The nozzle M24 is connected to the air feed source (not shown) such as a pump via a flow passage (not shown) for pressurized air, and the flow passage is equipped thereon with a control valve M25 configured to open and close the flow passage. Examples of the control valve M25 include an electromagnetic solenoid configured to open in accordance with a control signal transmitted from the controller C or the like. There is further installed a shutter, valve, or the like M51 positioned upstream of the powdery-material measurement device M, specifically between the buffer tank 19 and the importing port M5 or inside the importing port M5, and configured to block communication between the buffer tank 19 and the powdery-material measurement device M.

In this configuration, the controller C having determined that the sensor probe S3 currently has inappropriate properties initially closes the shutter, valve, or the like M51 to temporally block communication between the buffer tank 19 and the powdery-material measurement device M so as to prevent mixed-powdery materials from entering the powdery-material measurement device M. In this state, the rotator M2 is continuously rotary-driven to allow the mixed-powdery materials in the powdery-material measurement device M to be mostly or entirely discharged from the removal bore M12 (i.e., powdery-material remover M4) and/or the discharge bore M13 (i.e., discharger M6) such that the measurement device M hardly or never contains any powdery material remaining therein. Subsequently, the control valve M25 is opened to cause the nozzle M24 to discharge pressurized air fed from the air feed source, and the pressurized air blows and removes dust or dirt adhering to the sensor probe S3. The control valve M25 is then closed to stop discharge of air from the nozzle M24, and the shutter, valve, or the like M51 being closed is then opened to allow communication between the buffer tank 19 and the powdery-material measurement device M again to allow mixed-powdery materials to flow into the powdery-material measurement device M.

Figure 16:
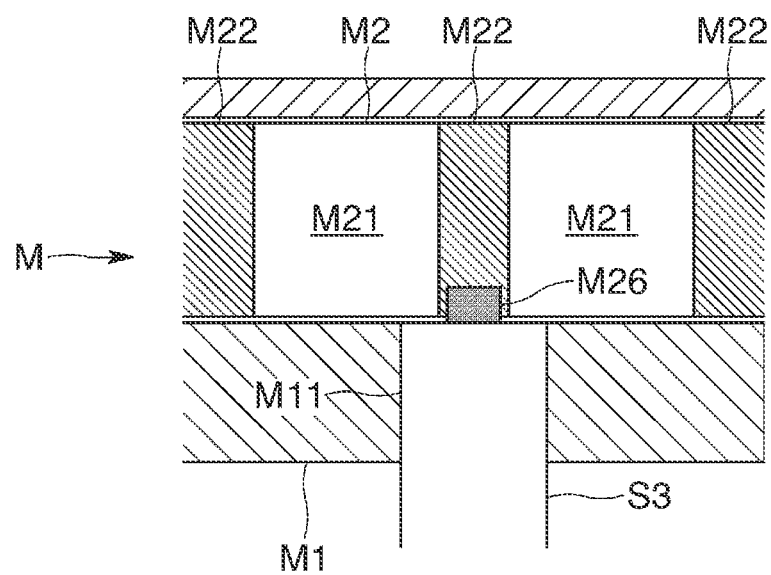
FIG. 16 is an enlarged side sectional view of part of the powdery-material measurement device according to the exemplary embodiment.

As shown exemplarily in FIGS. 10 and 16, the downward surface of the blade M22 of the rotator M2 preliminarily has a cleaning material M26 configured to come into contact with and wipe the sensor probe S3. The cleaning material M26 is a brush, a wiper rubber piece, or the like produced using a material that does not damage a surface of the sensor probe S3 even when the surface of the sensor probe S3 is grazed by the material, such as a resin-like silicon rubber or nylon (i.e., polyamide). The cleaning material M26 comes into contact with and slides on the surface of the sensor probe S3 as the rotator M2 and the blades M22 rotate, to wipe away dust or dirt adhering to the sensor probe S3.

Figure 17:
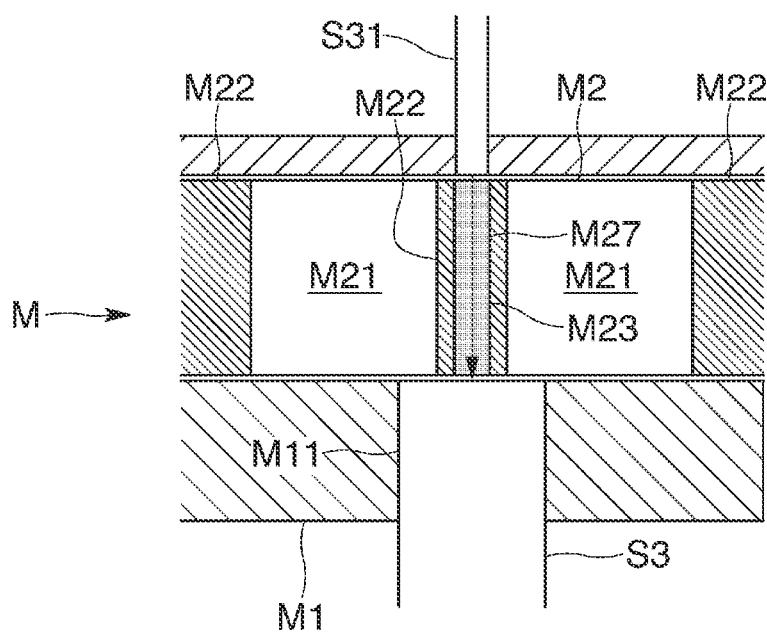
FIG. 17 is an enlarged side sectional view of part of the powdery-material measurement device according to the exemplary embodiment.

The sensor S3 is of the reflection-type configured to receive reflected light from mixed-powdery materials to be measured, to measure characteristics of the powdery materials. The sensor S3 may alternatively be of a transmission-type configured to receive transmitted light through the mixed-powdery materials to be measured, to measure characteristics of the powdery materials in the powdery-material measurement device M. As shown exemplarily in FIG. 17, there is disposed a light source S31 configured to emit a light wave (e.g., an electromagnetic wave, specifically near infra-red light) and positioned to face the sensor probe S3 with the transfer passage of mixed-powdery materials being interposed therebetween. The blade M22 of the rotator M2 has a window M27 penetrating to allow a light wave to pass therethrough, and the standard sample M23 is buried in the window M27. Such a configuration allows light emitted from the light source S31 and transmitted through the standard sample M23 to enter the sensor probe S3 and enable checking or calibrating the properties of the sensor probe S3.

The standard sample M23 is not limitedly disposed at the blade M22 of the rotator M2. As shown exemplarily in FIG. 18, a shutter M14, configured to open and close to shield the surface of the sensor probe S3 from above, may be equipped, and the standard sample M23 may be attached to a downward surface of the shutter M14. In order to measure characteristics of mixed-powdery materials, the shutter M14 is opened to retreat from above the sensor probe S3 and expose the surface of the sensor probe S3 that accordingly faces powdery materials to be measured. As shown exemplarily in FIG. 18, in order to check or calibrate the properties of the sensor probe S3, the shutter M14 is closed to cover the surface of the sensor probe S3 that accordingly faces the standard sample M23 disposed at the shutter M14.

Figure 20:
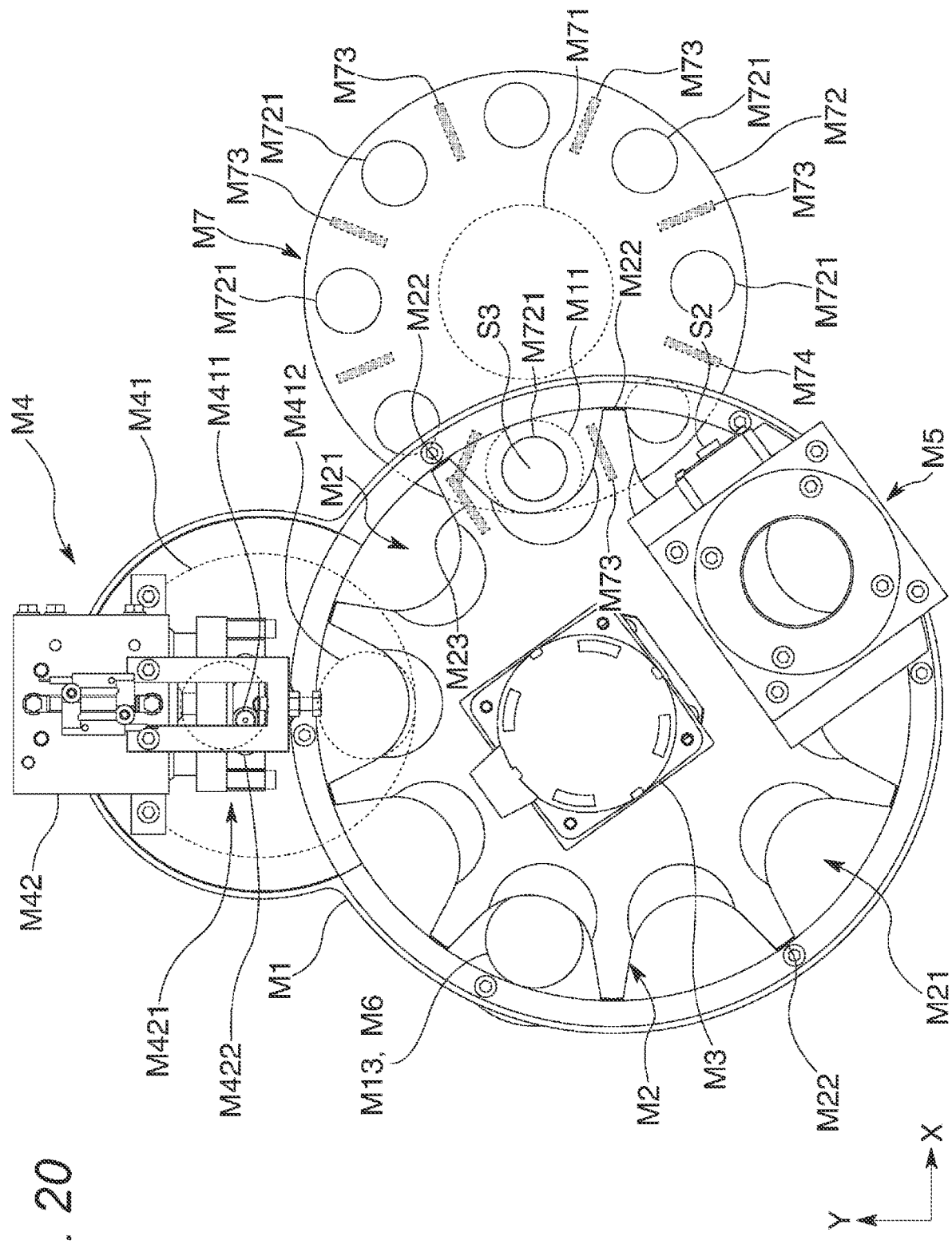
FIG. 20 is a plan view of a main part of a powdery-material measurement device according to a modification example of the exemplary embodiment.
Figure 21:
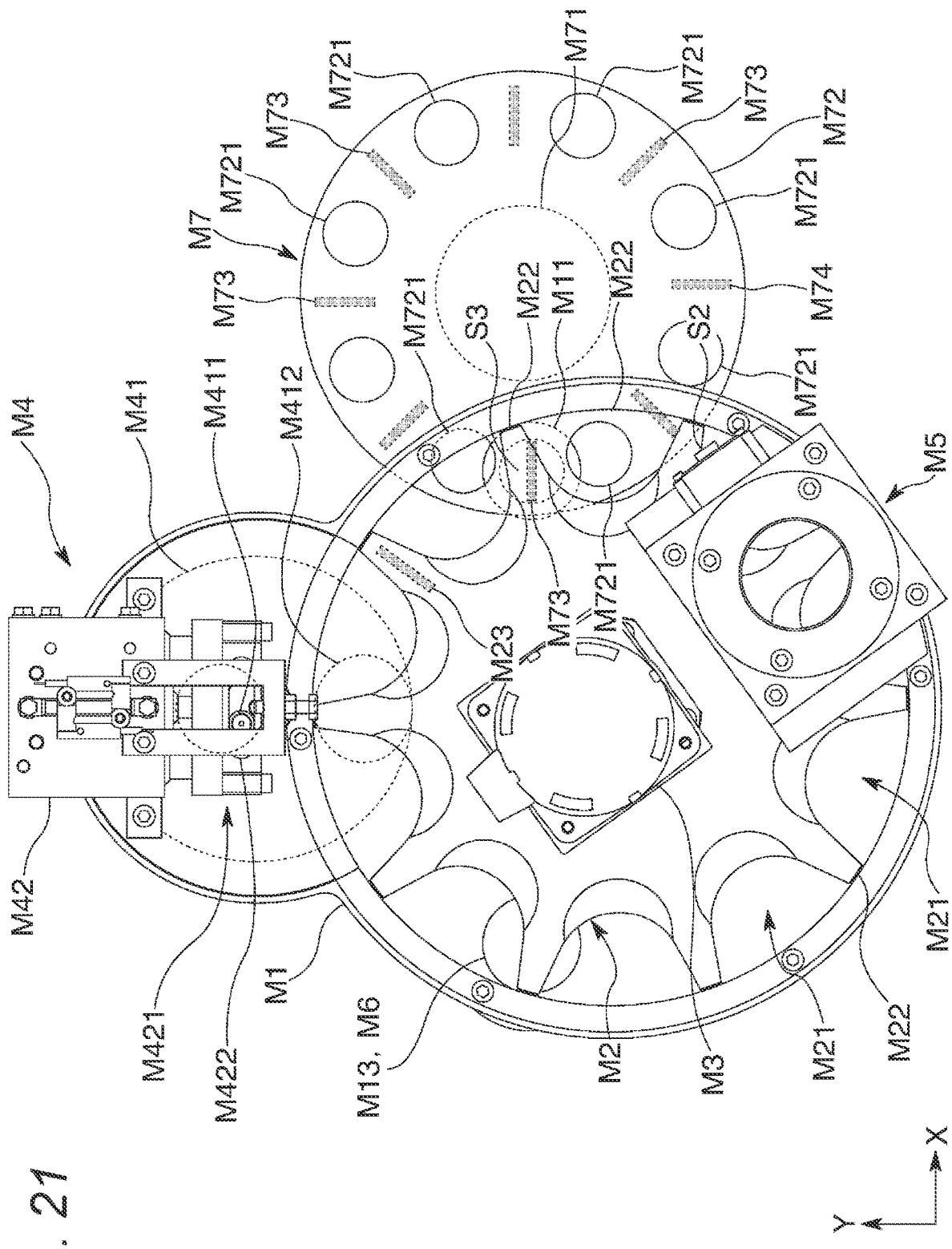
FIG. 21 is a plan view of a main part of a powdery-material measurement device according to the modification example of the exemplary embodiment.

Similarly, a cleaning material M73 is not necessarily disposed at a blade of the rotator M2. FIGS. 20 and 21 relate to a modification example, in which there is additionally equipped a cleaning mechanism M7 configured to clean the sensor probe S3 periodically or as needed while the powdery-material measurement device M is in operation. The cleaning mechanism M7 includes, as elements, a movable member M72 configured to move to pass by the sensor probe S3, a servo motor or a stepping motor M71 functioning as a driver for the movable member M72, and the cleaning material M73 disposed at the movable member M72.

The movable member M72 is a vertically thin circular disc disposed at a level vertically below the rotator M2 and vertically above the sensor probe S3, specifically, between the blades M22 and the prove S3. The movable member M72 has an outer circumferential portion including a portion that faces the sensor probe S3 and has windows M721 intermittently disposed in a circumferential direction around a rotary axis of the movable member M72. The windows M721 allow a light wave (e.g., an electromagnetic wave, specifically near infrared light) applied toward mixed-powdery materials, reflected light (i.e., a reflected wave) at the mixed-powdery materials, or transmitted light (i.e., a transmitted wave) through the mixed-powdery materials to pass therethrough.

Furthermore, the cleaning material M73, configured to come into contact with and wipe the sensor probe S3, is attached between the windows M721 adjacent to each other in a downward surface of the outer circumferential portion of the movable member M72. Similarly to the cleaning material M26 shown exemplarily in FIG. 16, the cleaning material M73 is a brush, a wiper rubber piece, or the like produced using a material that does not damage the surface of the sensor probe S3 even when the surface of the sensor probe S3 is grazed by the material. The cleaning material M73 comes into contact with and slides on the surface of the sensor probe S3 as the movable member M72 rotates, to wipe away dust or dirt adhering to the sensor probe S3.

Furthermore, the windows M721, adjacent to each other in the outer circumferential portion of the movable member M72, may interpose a standard sample M74. Similarly to the standard sample S23 shown exemplarily in FIGS. 14 and 17, the standard sample M74 encloses standard powdery materials having known characteristics that include a mixing degree and are kept constant.

As shown exemplarily in FIG. 20, the movable portion M21 capturing mixed-powdery materials in the rotator M2 is positioned near (e.g., adjacent) or vertically above the sensor probe S3, and the window M721 of the movable member M72 is positioned to be vertically above the probe S3 when the probe S3 measures the characteristics of the mixed-powdery materials. While the characteristics of mixed-powdery materials are not measured, the movable member M72 is rotated to cause the cleaning material M73 to wipe to clean the surface of the probe S3 as shown exemplarily in FIG. 21. In order to check or calibrate the properties of the sensor probe S3, the standard sample M23, disposed at the blade M22 and the window M721 of the movable member M72, will be positioned vertically above the probe S3, or the standard sample M74, disposed at the movable member M72, will be positioned vertically above the probe S3.

The fourth sensor S4 of a near infrared sensor measures the mixing degree or the like of the mixed-powdery materials that have any of characteristics measured by the sensor S3 of the powdery-material measurement device M and reached the powdery material feeding pipe 191 via the discharger M6 before the mixed-powdery materials are guided into the agitated feeder X functioning as a filling device of the molding machine. Furthermore, a fifth sensor S5 of a near infrared sensor measures the mixing degree or the like of the mixed-powdery materials in the agitated feeder X in the molding machine according to the exemplary embodiment.

If the mixing degree or the like of the mixed-powdery materials measured by the fourth sensor S4 and/or the fifth sensor S5 is out of the predetermined range, then the mixed-powdery materials in the feeder X are temporarily filled in each of the die bores 4 of the table 31 of the compression-molding machine and are compression molded by the upper and lower punches 5 and 6 into the shape of a molded product. The molded product is then removed by the molded-product removal mechanism W before reaching the molded-product collecting position 18. Specifically, in the molding machine, the control valve 122 is opened when the die bore 4 filled with defective mixed-powdery materials tableted into a molded product passes by the air spray nozzle 16a, and the air spray nozzle 16a sprays air to blow the molded product out of the table 31.

In summary, the powdery-material remover M4 removes the mixed-powdery materials if any of the first to third sensors S1 to S3 detects any of characteristics of the mixed-powdery materials out of the predetermined range, and the molded-product removal mechanism W removes the compression molded mixed-powdery materials if the fourth sensor S4 and/or the fifth sensor S5 detects any of characteristics of the mixed-powdery materials out of the predetermined range.

The molded-product removal mechanism W removes a molded product compression molded in any of the die bores 4 also in a case where any of the load cells 120 detects that compression pressure applied to the powdery material compressed in the die bore 4 is out of the predetermined range.

Summarized again below is a flow of continuous production of compression molded products by the compression-molding system according to the exemplary embodiment. Initially, the first measuring feeder Z1a simultaneously measures and feeds the principal agent, and the second measuring feeder Z1b simultaneously measures and feeds the excipient or the like (i.e., measuring and feeding). The vertical mixer Z3 functioning as the first mixer is subsequently fed with the powdery materials of the principal agent and the excipient or the like and mixes the powdery materials therein (i.e., first mixing). In the vertical mixer Z3, the agitating rotor Z34 rotates about the agitation shaft Z33 disposed substantially vertically, to mix the powdery materials of the principal agent and the excipient or the like.

The horizontal mixer Z4 functioning as the second mixer is fed with the mixed-powdery materials of the principal agent and the excipient or the like subjected to the first mixing and mixes the powdery materials again (i.e., second mixing). In the horizontal mixer Z4, the agitating rotor Z44 rotates about the agitation shaft Z42 disposed substantially horizontally, to mix the powdery materials of the principal agent and the excipient or the like. Such a process achieves improvement in mixing degree of the at least two types of powdery materials (e.g., the principal agent and the excipient or the like), and causes less segregation of the principal agent.

The first mixing preferably includes reserving at least part of the powdery materials. Specifically, the powdery materials pass through the plurality of bores Z321 of the powdery material passing member Z32. The reservoir Z30 reserves powdery materials by increase in amount of the powdery materials to be fed to the first vertical mixer Z3a to be more than the powdery materials passing through the bores Z321 or increase in a rotational speed of the auxiliary rotor Z35. The powdery materials then pass through the bores Z321 while being agitated and mixed by the auxiliary rotor Z35.

Furthermore, the third measuring feeder Z1c simultaneously measures and feeds the lubricant (i.e., lubricant feeding). The lubricant is fed to the horizontal mixer Z4 in the embodiment, but can alternatively be fed to a second vertical mixer Z3b, the feeder X, or the like, with no limitation in feeding destination of the lubricant to the horizontal mixer Z4. The lubricant can be fed by the μR feeder (e.g., manufactured by Nisshin Engineering Inc.) or by an atomizer (i.e., spray device).

Furthermore, the powdery materials are fed to the vertical mixer Z5 so as to be mixed after the second mixing by the horizontal mixer Z4 (i.e., third mixing), for further improvement in mixing degree of the powdery materials.

The mixed-powdery materials obtained by mixing the principal agent, the excipient or the like, and the lubricant are fed to the buffer tank 19 connected to the compression-molding machine. The sensor S2 or S3 in the powdery-material measurement device M then measures the mixing degree of the mixed-powdery materials fed to the buffer tank 19 (i.e., measuring). Obviously, the sensor S1 can measure the mixing degree of the mixed-powdery materials before the mixed-powdery materials are fed to the buffer tank 19.

The mixed-powdery materials are removed at the powdery-material measurement device M if the measured mixing degree of the mixed-powdery materials is out of the predetermined range (i.e., removing). The mixed-powdery materials are subsequently fed to the feeder X functioning as a filling device. The sensor S5 can measure the mixing degree of the mixed-powdery materials in the feeder X, or the sensor S4 can measure the mixing degree of the mixed-powdery materials immediately before the mixed-powdery materials are fed to the feeder X.

The mixed-powdery materials fed to the feeder X are filled in the die bore 4 of the table 31 of the turret 3 in the molding machine (i.e., filling). The mixed-powdery materials filled in each of the die bores 4 are compression molded by the upper and lower punches 5 and 6 (i.e., compression molding). The mixed-powdery materials thus compression molded into a molded product are guided by the guide member 17 and are collected at the molded-product collecting position 18. The controller C in the system according to the exemplary embodiment causes the fourth sensor S4 and/or the fifth sensor S5 to repeatedly measure the mixing degree of the mixed-powdery materials fed by the powdery-material mixing and feeding device Z to the feeder X and filled in the die bores 4. If the measured mixing degree of the mixed-powdery materials is out of the predetermined range, then the molded-product removal mechanism W in the molding machine removes a defective molded product compression molded in the die bore 4 filled with the mixed-powdery materials (i.e., molded product removing).

The controller C further causes the load cell 120 to measure compression pressure applied from the punches 5 and 6 to the powdery material in each of the die bores 4 to obtain a molded product. The controller C causes the molded-product removal mechanism W to remove a defective molded product compression molded in the die bore 4 having compression pressure out of the predetermined range (i.e., molded product removing). In a case where a powdery material filled in the die bore 4 is more than an appropriate amount, compression pressure measured by the load cell 120 exceeds the predetermined range. In another case where the powdery material filled in the die bore 4 is less than the appropriate amount, compression pressure measured by the load cell 120 is less than the predetermined range. In either one of the cases, the molded product compression molded in the die bore 4 has weight, density, and hardness different from desired values and is regarded as defective.

When the die bore 4 assumed to be filled with such defective mixed-powdery materials having a mixing degree out of the predetermined range or the die bore 4 receiving compression pressure out of the predetermined range (i.e., the possibly defective molded product, passes by the air spray nozzle 16a is found by referring to an output signal from the rotary encoder 123).

Prior to filling the die bore 4 in the table 31 in the compression-molding machine with the powdery materials, the lubricant (i.e., external lubricant) can optionally be sprayed to the lower end surface of the upper punch 5, the upper end surface of the lower punch 6, and the inner circumferential surface of the die bore 4 (i.e., lubricant feeding).

The first measuring feeder Z1a is configured to feedback control weight (i.e., a flow rate) of the fed principal agent per unit time, the second measuring feeder Z1b is configured to feedback control weight of the fed excipient or the like per unit time, and the third measuring feeder Z1c is configured to feedback control weight of the fed lubricant per unit time. Furthermore, these powdery materials are to be mixed at a desired mixture ratio. Even in this configuration, the amounts of the powdery materials discharged from the measuring feeders Z1 and fed to the mixers Z3 and Z4 can somehow deviate from initial target amounts. The powdery material fed from any of the measuring feeders Z1 to the mixer Z3 or Z4 is sometimes smaller than the target amount. In such a case, the amount of the principal agent in the mixed-powdery materials has a ratio larger or smaller than the desired ratio. A molded product obtained by compression molding such mixed-powdery materials is defective and will fail to exert an expected drug effect.

Even if the mixer Z3 or Z4 fails to adequately mix the powdery materials and the mixed-powdery materials fed to the feeder X of the compression-molding machine have segregation of the principal agent or the excipient, molded products will be defective with different contents.

The controller C in the system according to the exemplary embodiment adjusts, in accordance with the mixing degree measurement value of the mixed-powdery materials by any of the first to fifth sensors S1 to S5, the amounts of the powdery materials fed by the measuring feeders Z1a to Z1c, rotational speed of each of the agitation shaft Z33, the agitating rotor Z34, and the auxiliary rotor Z35 of the vertical mixer Z3, rotational speed of each of the agitation shaft Z42 and the agitating rotor Z44 of the horizontal mixer Z4, and rotational speed of the agitation shaft and the agitating rotor in the vertical mixer Z5. Examples of the controller C include a microcomputer system including a processor, a memory, an auxiliary storage device, and an input/output interface, a programmable controller, a general-purpose personal computer, and a work station.

In a case where the absolute value of a difference between a target value and the amount or the percentage of the principal agent in the mixed-powdery materials repeatedly measured by any of the first to fifth sensors S1 to S5 is more than a predetermined threshold (i.e. the percentage of the principal agent is inappropriately small or large) continuously for at least a certain period, at least one of the first to third measuring feeders Z1a to Z1c is regarded as failing to feed an appropriate amount of the powdery materials. In this case, the controller C temporarily interrupts weight feedback control by the measuring feeder Z1 itself and adjusts rotational speed of a drive motor of each of the measuring feeders Z1 such that the amount or the percentage of the principal agent in the mixed-powdery materials measured by any of the first to fifth sensors S1 to S5 is approximate to the target value. In a case where the measured amount or the measured percentage of the principal agent in the mixed-powdery materials is less than the target value, the first measuring feeder Z1a increases the amount of the discharged principal agent, and/or the second measuring feeder Z1b decreases the amount of the discharged excipient or the like and the third measuring feeder Z1c decreases the amount of the discharged lubricant. In another case where the measured amount or the measured percentage of the principal agent in the mixed-powdery materials is more than the target value, the first measuring feeder Z1a decreases the amount of the discharged principal agent, and/or the second measuring feeder Z1b increases the amount of the discharged excipient or the like and the third measuring feeder Z1c increases the amount of the discharged lubricant.

Alternatively, if the absolute value of the difference between the target value and the amount or the percentage of the principal agent in the mixed-powdery materials is more than the threshold continuously for at least a certain period, then the target value of the discharged amount of the powdery materials commanded by the controller C to the measuring feeders Z1a to Z1c can be changed to optimize the amount of the fed principal agent. In a case where the measured amount or the measured percentage of the principal agent in the mixed-powdery materials is less than the target value, the first measuring feeder Z1a has a higher target value of the amount of the discharged principal agent, and/or the second measuring feeder Z1b has a lower target value of the amount of the discharged excipient or the like and the third measuring feeder Z1c has a lower target value of the amount of the discharged lubricant. In another case where the measured amount or the measured percentage of the principal agent in the mixed-powdery materials is more than the target value, the first measuring feeder Z1a has a lower target value of the amount of the discharged principal agent, and/or the second measuring feeder Z1b has a higher target value of the amount of the discharged excipient or the like and the third measuring feeder Z1c has a higher target value of the amount of the discharged lubricant.

In a case where the absolute value of the difference between the target value and the amount or the percentage of the principal agent in the mixed-powdery materials repeatedly measured by any of the first to fifth sensors S1 to S5 is more than the threshold not continuously for at least a certain period but is more than the threshold instantaneously or only for a short period, (the principal agent, the excipient or the like, or the lubricant of) the mixed-powdery materials moving toward the feeder X in the molding machine is regarded as having segregation (i.e. locally having portions of high and low concentrations of the principal agent). In this case, the controller C changes (i.e., increases or decreases) current rotational speed of the agitation shaft Z33 and the agitating rotors Z34 and Z35 of the vertical mixer Z3, changes (i.e., increases or decreases) current rotational speed of the agitation shaft Z42 and the agitating rotor Z44 of the horizontal mixer Z4, and/or changes (i.e., increases or decreases) current rotational speed of the agitation shaft and the agitating rotor of the vertical mixer Z5, to further improve the mixing degree of the powdery materials.

Also in the case where the absolute value of the difference between the target value and the amount or the percentage of the principal agent in the mixed-powdery materials is more than the threshold continuously for at least the certain period, the controller C can control to change current rotational speed of the agitating rotors Z34 and Z35 of the vertical mixer Z3, to change current rotational speed of the agitating rotor Z44 of the horizontal mixer Z4, and/or to change current rotational speed of the agitating rotor of the vertical mixer Z5.

As described above, increasing or decreasing each of the amounts of the powdery materials discharged from the measuring feeders Z1a to Z1c or changing rotational speed of the agitation shaft Z33 or Z42 of each of the mixers Z3 to Z5 can possibly vary the flow rate per unit time of the powdery materials passing the buffer tank 19 or the importing port M5 functioning as the supplier configured to feed the powdery-material measurement device M with the mixed-powdery materials.

If the rotator M2 of the powdery-material measurement device M is kept rotating at constant rotational speed despite change in flow rate of the mixed-powdery materials in the buffer tank 19 or the importing port M5, the mixed-powdery materials accumulated in the buffer tank 19 or the importing port M5 has an upper surface L1 varied in level because the mixed-powdery materials are captured and transferred by the movable portions M21 of the rotator M2 and the mixed-powdery materials passing through the powdery-material measurement device M are thus not changed in amount per unit time. The upper surface L1 of the powdery materials in the buffer tank 19 or the importing port M5 increases in level in a case where the powdery materials fed to the movable portions M21 of the rotator M2 are larger in flow rate per unit time than the powdery materials transferred by the powdery-material measurement device M. The upper surface L1 of the powdery materials in the buffer tank 19 or the importing port M5 decreases in level in another case where the powdery materials fed to the movable portions M21 of the rotator M2 are smaller in flow rate per unit time than the powdery materials transferred by the powdery-material measurement device M.

When the upper surface L1 of the powdery materials significantly increases or decreases in level in the buffer tank 19 or the importing port M5 disposed above and directly connected to the powdery-material measurement device M, the powdery materials fed to the movable portions M21 of the rotator M2 increase or decrease from the appropriate amount, and the powdery materials captured in the movable portions M21 (i.e., the powdery materials to be measured by the sensor S3), are varied in density. This may lead to deteriorated accuracy in measurement of the properties of the powdery materials by the sensor S3.

In order to inhibit such variation in amount or density of the fed powdery materials, the controller C according to the exemplary embodiment causes a sensor S6 to obtain the level of the upper surface L1 of the mixed-powdery materials in the buffer tank 19 or the importing port M5 and adjusts rotational speed of the motor M3, eventually the rotator M2, of the powdery-material measurement device M in accordance with the level of the upper surface.

Figure 22:
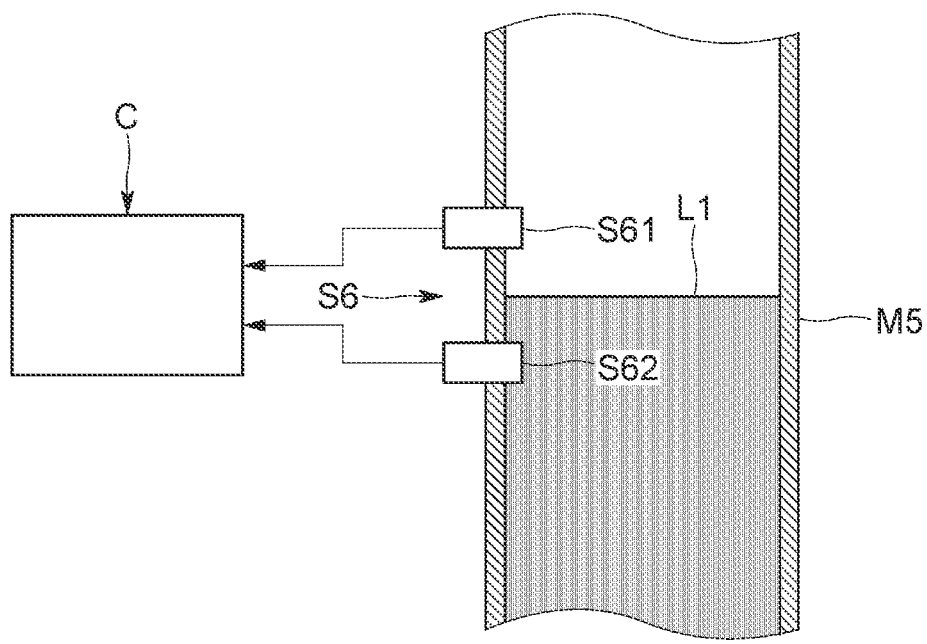
FIG. 22 is a side sectional view of a supplier included in the powdery-material measurement device according to the exemplary embodiment.

As shown exemplarily in FIG. 22, the buffer tank 19 or the importing port M5 has two capacitance level switches S61 and S62 each functioning as the sensor S6. The level switches S61 and S62 are configured to detect whether the level of the upper surface L1 of a powdery material accumulated in the buffer tank 19 or the importing port M5 is higher or lower than the level switches S61 and S62, respectively. The controller C is configured to determine, with use of the level switches S61 and S62, whether the level of the upper surface L1 of the powdery material in the buffer tank 19 or the importing port M5 is above the upper level switch S61, is below the upper level switch S61 and above the lower level switch S62, or is below the lower level switch S62. When the level of the upper surface L1 of the powdery material in the buffer tank 19 or the importing port M5 is below the upper level switch S61 and above the lower level switch S62, the upper surface level of the powdery material is regarded as being within a desired target range.

In a case where the upper surface level of the powdery material in the buffer tank 19 or the importing port M5 is not lower than an upper limit of the target range (i.e., when the upper surface level is not lower than the upper level switch S61), the controller C according to the exemplary embodiment increases rotational speed of the rotator M2 of the powdery-material measurement device M in comparison to a case where the upper surface level is within the target range. This leads to increase in flow rate per unit time of the powdery material transferred by the powdery-material measurement device M and decrease in level of the upper surface of the powdery material in the buffer tank 19 or the importing port M5 to be within the target range.

In another case where the upper surface level of the powdery material in the buffer tank 19 or the importing port M5 is not higher than the lower limit of the target range (i.e., when the upper surface level is not higher than the lower level switch S62), the controller C decreases rotational speed of the rotator M2 in comparison to the case where the upper surface level is within the target range. This leads to decrease in flow rate per unit time of the powdery material transferred by the powdery-material measurement device M and increase in level of the upper surface of the powdery material in the buffer tank 19 or the importing port M5 to be within the target range.

When the rotational speed of the rotator M2 is controlled, a period of increase in rotational speed, while the upper surface level of the powdery material in the buffer tank 19 or the importing port M5, decreases from the upper limit toward the lower limit in the target range, and a period of decrease in rotational speed, while the upper surface level of the powdery material in the buffer tank 19 or the importing port M5, increases from the lower limit toward the upper limit in the target range, can repeat alternately.

As indicated in FIG. 24, the controller C according to the exemplary embodiment may control, under such a condition, rotational speed of the rotator M2 such that, as to a first period of increase in speed and a subsequent second period of increase in speed, the second period is longer than the first period. For example, the rotational speed of the rotator M2 in the subsequent second period of increase in speed is made lower than the rotational speed of the rotator M2 in the first period of increase in speed.

The controller C also controls the rotational speed of the rotator M2 in a first period of decrease in speed and a subsequent second period of decrease in speed such that the second period is longer than the first period. For example, the rotational speed of the rotator M2 in the subsequent second period of increase in speed is made higher than the rotational speed of the rotator M2 in the first period of increase in speed. Such control eventually allows the upper surface level of the powdery material in the buffer tank 19 or the importing port M5 to stably be kept without reaching the upper limit or the lower limit of the target range.

Furthermore, as described above, increasing or decreasing each of the amounts of the powdery materials discharged from the measuring feeders Z1a to Z1c, changing rotational speed of the agitation shaft Z33 or Z42 of each of the mixers Z3 to Z5, or changing rotational speed of the rotator M2 in the powdery-material measurement device M can possibly vary the flow rate per unit time of the powdery materials passing the powdery material feeding pipe 191 configured to feed the feeder X of the molding machine with the mixed-powdery materials.

If the turret 3 and the punches 5 and 6 of the molding machine are kept rotating at constant rotational speed despite change in flow rate of the mixed-powdery materials toward the powdery material feeding pipe 191, then the mixed-powdery materials accumulated in the powdery material feeding pipe 191 has an upper surface L2 varied in level because the molding machine uses a constant amount of the mixed-powdery materials per unit time. The level of the upper surface L2 of the powdery material in the powdery material feeding pipe 191 increases in a case where the powdery material fed to the powdery material feeding pipe 191 has a flow rate per unit time more than the amount of the powdery material used by the molding machine per unit time. The level of the upper surface L2 of the powdery material in the powdery material feeding pipe 191 decreases in another case where the powdery material fed to the powdery material feeding pipe 191 has a flow rate per unit time less than the amount of the powdery material used by the molding machine per unit time.

Large variation in level of the upper surface L2 of the powdery material in the powdery material feeding pipe 191 disposed above and directly connected to the feeder X will lead to increase or decrease from the appropriate amount of the powdery material filled into the die bores 4 from the feeder X and defectiveness of the product molded in the die bores 4.

In order to inhibit such variation in amount of the filled powdery material, the controller C according to the exemplary embodiment causes a sensor S7 to obtain the level of the upper surface L2 of the mixed-powdery materials in the powdery material feeding pipe 191 and adjusts rotational speed of the motor 8, eventually the turret 3 and the punches 5 and 6 of the molding machine in accordance with the level of the upper surface.

Figure 23:
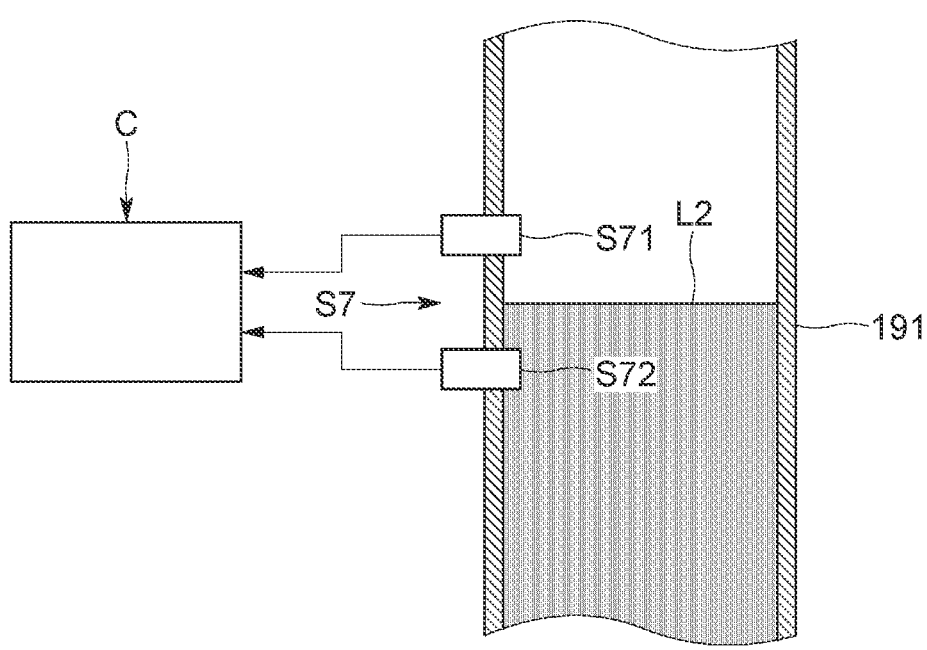
FIG. 23 is a side sectional view of a feeding pipe included in the powdery-material mixing and feeding device according to the exemplary embodiment.

As shown exemplarily in FIG. 23, the powdery material feeding pipe 191 has two capacitance level switches S71 and S72 each functioning as the sensor S7. The level switches S71 and S72 are configured to detect whether the level of the upper surface L2 of a powdery material accumulated in the powdery-material feeding pipe 191 is higher or lower than the level switches S71 and S72, respectively. The controller C is configured to determine, with use of the level switches S71 and S72, whether the level of the upper surface L2 of the powdery material in the feeding pipe 191 is above the upper level switch S71, is below the upper level switch S71 and above the lower level switch S72, or is below the lower level switch S72. When the level of the upper surface L2 of the powdery material in the feeding pipe 191 is below the upper level switch S71 and above the lower level switch S72, the upper surface level of the powdery material is regarded as being within a desired target range.

In a case where the upper surface level of the powdery material in the powdery-material feeding pipe 191 is not lower than the upper limit of the target range (i.e., when the upper surface level is not lower than the upper level switch S71), the controller C according to the exemplary embodiment increases the rotational speed of the turret 3 as well as the punches 5 and 6 of the molding machine in comparison to a case where the upper surface level is within the target range. This leads to increase in the amount of the powdery material used by the molding machine per unit time and decrease in level of the upper surface of the powdery material in the powdery material feeding pipe 191 to be within the target range.

In another case where the upper surface level of the powdery material in the powdery-material feeding pipe 191 is not higher than the lower limit of the target range (i.e., when the upper surface level is not higher than the lower level switch S71), the controller C decreases the rotational speed of the turret 3, as well as the punches 5 and 6 of the molding machine in comparison to the case where the upper surface level is within the target range. This leads to decrease in the amount of the powdery material used by the molding machine per unit time and increase in level of the upper surface of the powdery material in the powdery-material feeding pipe 191 to be within the target range.

When the rotational speed of the turret 3 and the punches 5 and 6 of the molding machine is controlled, a period of increase in the rotational speed, while the upper surface level of the powdery material in the powdery-material feeding pipe 191, decreases from the upper limit toward the lower limit in the target range, and a period of decrease in the rotational speed, while the upper surface level of the powdery material in the feeding pipe 191, increases from the lower limit toward the upper limit in the target range, can repeat alternately.

As indicated in FIG. 24, the controller C according to the exemplary embodiment controls, under such a condition, a rotational speed of the turret 3 and the punches 5 and 6 in a first period of increase in speed and a subsequent second period of increase in speed such that the second period is longer than the first period. For example, the rotational speed of the turret 3 and the punches 5 and 6 in the subsequent second period of increase in speed is made lower than the rotational speed of the turret 3 and the punches 5 and 6 in the first period of increase in speed.

The controller C also controls the rotational speed of the turret 3 and the punches 5 and 6 in a first period of decrease in speed and a subsequent second period of decrease in speed such that the second period is longer than the first period. For example, the rotational speed of the turret 3 and the punches 5 and 6 in the subsequent second period of increase in speed is made higher than the rotational speed of the turret 3 and the punches 5 and 6 in the first period of increase in speed. Such control eventually allows the upper surface level of the powdery material in the powdery-material feeding pipe 191 to stably be kept without reaching the upper limit or the lower limit of the target range.

As already described, the powdery-material remover M4 of the powdery-material mixing and feeding device Z configured to deliver a powdery material toward the powdery-material feeding pipe 191 occasionally removes any defective powdery material without feeding to the powdery-material feeding pipe 191. Removal of such a powdery material by the powdery-material remover M4 leads to decrease in an amount of the powdery material delivered toward the powdery-material feeding pipe 191 per unit time, so that the upper surface level of the powdery material in the powdery-material feeding pipe 191 may be decreased.

In a case where the powdery-material remover M4 removes the powdery material even though the upper surface level of the powdery material is below the upper level switch S71 and above the lower level switch S72, the controller C according to the exemplary embodiment conducts feedforward control of decreasing rotational speed of the turret 3 and the punches 5 and 6 of the molding machine in comparison to the contrast case. Specifically, when the controller C receives a signal indicating that the driver M42 in the powdery-material remover M4 operates and the powdery material captured by the movable portions M21 of the rotator M2 is dropped into the removal bore M12, the controller C decreases a current rotational speed of the turret 3 and the punches 5 and 6. It is assumed that the rotational speed of the turret 3 and the punches 5 and 6 has a value obtained by multiplying the rotational speed immediately before the decrease in speed and a coefficient (i.e., larger than zero) smaller than one.

When the controller C controls to decrease the rotational speed of the turret 3 and the punches 5 and 6 of the molding machine in response to removal of the powdery material by the powdery-material remover M4, the rotational speed is decreased preferably at a rate according to the rotational speed immediately before the decrease in speed.

In a case where the turret 3 and the punches 5 and 6 immediately before the decrease in speed have relatively high rotational speed, the powdery-material mixing and feeding device Z feeds the powdery-material feeding pipe 191 and eventually the feeder X with the powdery material originally having a large flow rate per unit time. Meanwhile, the powdery-material remover M4 removes, at one time, the powdery material having a fundamentally constant amount equal to that of the powdery material captured by one of the movable portions M21 of the rotator M2. Accordingly, if the powdery material is removed while the turret 3 and the punches 5 and 6 have relatively high rotational speed, then the powdery-material mixing and feeding device Z feeds the powdery-material feeding pipe 191 with the powdery material having a small decrease rate per unit time and such removal has a relatively small influence. The rotational speed of the turret 3 and the punches 5 and 6 of the molding machine can have a small decrease rate upon removal of the powdery material, so that the coefficient multiplied by the rotational speed immediately before the decrease in the speed is set to have a larger value.

In another case where the turret 3 and the punches 5 and 6 have a relatively low rotational speed immediately before the decrease in speed, the powdery-material mixing and feeding device Z feeds the powdery-material feeding pipe 191 with the powdery material originally having a small flow rate per unit time. Meanwhile, the powdery-material remover M4 removes, at one time, the powdery material having a fundamentally constant amount. If the powdery material is removed while the turret 3 and the punches 5 and 6 have a relatively low rotational speed, then the powdery-material mixing and feeding device Z feeds the powdery-material feeding pipe 191 with the powdery material having a large decrease rate per unit time and such a removal has a relatively large influence. The rotational speed of the turret 3 and the punches 5 and 6 of the molding machine thus needs to have a large decrease rate upon removal of the powdery material, so that the coefficient multiplied by the rotational speed immediately before the decrease in speed is set to have a smaller value.

The powdery-material measurement device M according to the exemplary embodiment is combined with the compression-molding machine to constitute a compression-molding system. The compression-molding machine is exemplarily of a rotary type and is configured to rotate a turret 3 including a table 31 having a die bore 4, and punch-retaining portions 32 and 33 vertically slidably retaining punches 5 and 6 disposed above and below the die bore 4, along with the punches 5 and 6, and fill the die bore 4 with a powdery material from a filling device X disposed vertically above the table 31, to compress the powdery material filled in the die bore 4 with the punches 5 and 6 and obtain a molded product. compression-molding machine further includes a controller C configured to adjust rotational speed of the turret 3 and the punches 5 and 6 to cause the powdery material in a feeding pipe 191 directly connected to the filling device X and configured to be fed with the powdery material discharged from a discharger M6 of the powdery-material measurement device M to have an upper surface level kept within a constant target range.

Specifically, the controller C is configured to increase the rotational speed of the turret 3 and the punches 5 and 6 when the upper surface level of the powdery material in the feeding pipe 191 is not below the upper limit of the target range, and decrease the rotational speed of the turret 3 and the punches 5 and 6 when the upper surface level of the powdery material in the feeding pipe 191 is not above the lower limit of the target range.

Increase in the rotational speed of the turret 3 and the punches 5 and 6 in the rotary compression-molding machine leads to increase in an amount of a powdery material used in the molding machine per unit time. In contrast, decrease in the rotational speed of the turret 3 and the punches 5 and 6 leads to decrease in an amount of the powdery material used per unit time. Increase in the amount of the powdery material used per unit time leads to decrease in the level of the upper surface of the powdery material in the feeding pipe 191 directly connected to the filling device X, whereas decrease in the amount of the powdery material used per unit time leads to increase in the level of the upper surface of the powdery material in the feeding pipe 191.

The exemplary embodiment allows the upper surface level of the powdery material in the feeding pipe 191 to be kept within the constant target range by adjustment of the rotational speed of the turret 3 and the punches 5 and 6 of the rotary compression-molding machine. The rotational speed of the turret 3 is decreased to decrease the amount of the used powdery material before the powdery material in the filling device X becomes short, and the rotational speed of the turret 3 is increased to increase the amount of the used powdery material before the powdery material overflows. This prevents a state where the molding machine needs to be stopped.

Constantly keeping the upper surface level of the powdery material in the feeding pipe 191 (or in the filling device X) (i.e., constantly keeping pressure of the powdery material in the filling device X), is effective for continuously filling the die bores 4 with a constant amount of the powdery material from the filling device X. Excessiveness or shortage from the appropriate amount of the powdery material filled in the die bores 4 leads to finished products having hardness, density, and weight different from the desired values. The powdery material filled in the die bores 4 thus needs to have a variation in amount as small as possible. Precise control of the amount of the powdery material filled in the die bores 4 leads to highly kept quality of the obtained molded products.

The upper surface level of the powdery material significantly decreases in the feeding pipe 191 directly connected to the filling device X of the molding machine (or in the filling device X) in an exemplary case where the remover M4 included in the powdery-material measurement device M, configured to deliver a powdery material toward the feeding pipe 191, removes a defective powdery material instead of feeding to the feeding pipe 191. In such a case, the rotational speed of the turret 3 and the punches 5 and 6 may be preferably decreased in comparison to a contrast case.

In the exemplary embodiment, the level of the upper surface L1 of the powdery material in the supplier 19 or M5 is detected by the two-level switches S61 and S62 and the level of the upper surface L2 of the powdery material in the feeding pipe 191 is detected by the two-level switches S71 and S72. The sensors S6 and S7 each configured to detect the level of the upper surface L1 or L2 of the powdery material are, however, not limited to these level switches S61, S62, S71, and S72. Examples of the sensors S6 and S7 also include a contact level gauge configured to directly contact a powdery material accumulated in the supplier 19 or M5 or the feeding pipe 191 and measure the level of the upper surface L1 or L2, and a contactless level gauge configured to emit an ultrasonic wave or an electromagnetic wave toward the upper surface L1 or L2 of the powdery material and receive a reflected wave thereof to measure the level of the upper surface L1 or L2 of the powdery material. The level of the upper surface L1 or L2 of the powdery material can alternatively be obtained by photographing the interior of the supplier 19 or M5 or the feeding pipe 191 with a camera sensor and analyzing a captured image with the controller C.

According to the exemplary embodiment, the rotational speed of the turret 3 and the punches 5 and 6 in the molding machine is adjusted such that the level of the upper surface L of the powdery material in the feeding pipe 191 directly connected to the filling device X is kept within the constant target range. Alternatively, the filling device X can be equipped with a level switch or a level gauge configured to obtain a level of the upper surface of the powdery material in the filling device X (particularly in a case where the filling device X is configured as a gravity feeder) to adjust the rotational speed of the turret 3 and the punches 5 and 6 of the molding machine such that the upper surface level of the powdery material in the filling device X is kept within the constant target range.

In this case, the rotational speed of the turret 3 and the punches 5 and 6 is increased if the upper surface level of the powdery material in the filling device X is not lower than the upper limit of the target range, whereas the rotational speed of the turret 3 and the punches 5 and 6 is decreased if the upper surface level of the powdery material in the filling device X is not higher than the lower limit of the target range.

When there are the period of increase in rotational speed of the turret 3 and the punches 5 and 6 to allow the upper surface level of the powdery material in the filling device X to decrease from or above the upper limit of the target range toward the lower limit of the target range and the period of decrease in rotational speed of the turret 3 and the punches 5 and 6 to allow the upper surface level of the powdery material in the filling device X to increase from or below the lower limit of the target range toward the upper limit of the target range, the controller C preferably controls the rotational speed of the turret 3 and the punches 5 and 6 such that the subsequent second period of increase in speed is longer than the first period of increase in speed, and preferably controls the rotational speed of the turret 3 and the punches 5 and 6 such that the subsequent second period of decrease in speed is longer than the first period of decrease in speed.

The controller C can alternatively conduct feedback control of precisely adjusting the rotational speed of the rotator M2 in the powdery-material measurement device M, or the turret 3 and the punches 5 and 6 in the molding machine in accordance with a degree of difference between the level of the upper surface L1 or L2 of the powdery material detected by the sensor S6 or S7 and the target value (which can be a median value, the upper limit, or the lower limit of the target range) so as to keep the level of the upper surface L1 or L2 of the powdery material accumulated in the supplier 19 or M5, in the feeding pipe 191, or in the filling device X within the target range. In a case where the upper surface level of the powdery material is higher than the target value, the rotational speed is decreased as the absolute value of the difference between the upper surface level and the target value is larger. In another case where the upper surface level of the powdery material is lower than the target value, the rotational speed is increased as the absolute value of the difference between the upper surface level and the target value is larger. A controller in a control system embodied by the controller C can be designed in any appropriate manner. Examples of the manner of designing the controller in the control system include various manners such as a Proportional Integral Derivative (PID) control, a model-based predictive control, and a learning control.

Alternatively, in order to keep the level of the upper surface L1 or L2 of the powdery material accumulated in the supplier 19 or M5, in the feeding pipe 191, or in the filling device X within the target range, the controller C can measure the flow rate of the powdery material fed to the supplier 19 or M5 or the feeding pipe 191 with a flowmeter and control to increase the rotational speed of the rotator M2, or the turret 3 and the punches 5 and 6 if the flow rate is larger.

Further, in order to keep the level of the upper surface L1 or L2 of the powdery material accumulated in the supplier 19 or M5, in the feeding pipe 191, or in the filling device X within the target range, the controller C can measure pressure (i.e., from the accumulated powdery material) in the supplier 19 or M5, in the feeding pipe 191, or in the filling device X with a pressure gauge and control to increase the rotational speed of the rotator M2, or the turret 3 and the punches 5 and 6, if the internal pressure is larger.

The exemplary embodiment provides a powdery-material measurement device M configured to measure characteristics of mixed-powdery materials obtained by mixing two or more types of powdery materials and then deliver the mixed-powdery materials toward an equipment (e.g., a rotary compression-molding machine) configured to execute a post process using the mixed-powdery materials. The powdery-material measurement device includes a sensor probe S3 configured to receive reflected light from the mixed-powdery materials passing nearby or transmitted light through the mixed-powdery materials to measure the characteristics of the mixed-powdery materials while the powdery-material measurement device is in operation to deliver the mixed-powdery materials toward the equipment and a standard sample M23, M74 having known characteristics and facing the sensor probe S3 that is disposed to receive reflected light from the sensor probe S3 or transmitted light through the sensor probe, when the mixed-powdery materials are not present near the sensor probe S3 while the powdery-material measurement device is in operation to deliver the mixed-powdery materials toward the equipment.

The exemplary embodiment enables checking or calibrating the properties of the sensor probe S3 without being detached from the powdery-material measurement device M while the powdery-material mixing and feeding device Z including the powdery-material measurement device M and the molding machine are continuously in operation. It is possible to keep high accuracy in analysis of the characteristics of mixed-powdery materials by the measurement device M (e.g., via the sensor S3), to prevent deterioration in quality of the mixed-powdery materials fed from the powdery-material mixing and feeding device Z and also deterioration in quality of molded products produced by the molding machine.

The standard sample M23 or M74 according to the exemplary embodiment is disposed in the portion (specifically, the blade M22) facing the sensor probe S3 in the movable member M2 or M72 (specifically, the rotator M2 capturing and transferring mixed-powdery materials to be delivered toward the equipment) which moves to pass by the sensor probe S3. This configuration prevents increase in size and achieves a compact size of the powdery-material measurement device M. This configuration further enables calibration while the mixed-powdery materials are continuously transferred (specifically when the blade M22 passes by or is positioned near the sensor probe S3).

Moreover, when the cleaning material M26 or M73, configured to come into contact with and wipe the sensor probe S3, is disposed in the portion (specifically, the blade M22) facing the sensor probe S3, of the movable member M2 or M72, the sensor probe S3 can be cleaned while mixed-powdery materials are continuously transferred. This eventually enables the input and output properties of the sensor probe S3 to be appropriately kept for a long period of time.

It is also preferable to equip the nozzle M24, configured to discharge gas, to blow and remove dust or dirt adhering to the sensor probe S3.

The exemplary invention is not limited to the embodiment detailed above. Specific configurations of the respective portions can be modified without departing from the spirit of the exemplary invention.

The descriptions of the various exemplary embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A powdery-material measurement device configured to measure characteristics of mixed-powdery materials obtained by mixing two or more types of powdery materials and then deliver the mixed-powdery materials toward an equipment configured to execute a post process using the mixed-powdery materials, the powdery-material measurement device comprising:
 a sensor probe configured to receive reflected light from the mixed-powdery materials passing adjacent thereto or transmitted light through the mixed-powdery materials to measure the characteristics of the mixed-powdery materials while the powdery-material measurement device is in operation to deliver the mixed-powdery materials toward the equipment; and
 a standard sample having known characteristics and rotatably movable to face the sensor probe that is disposed to receive the reflected light from the standard sample or the transmitted light through the standard sample, when the mixed-powdery materials are not present adjacent the sensor probe while the powdery-material measurement device is in operation to deliver the mixed-powdery materials toward the equipment; and
 a movable member configured to move to pass by the sensor probe,
 wherein the movable member includes a portion facing the sensor probe and including the standard sample buried and enclosed in the movable member.

2. The powdery-material measurement device according to claim 1, wherein the movable member is configured to move to pass by the sensor probe,
 wherein the movable member includes a portion facing the sensor probe and including a cleaning material configured to come into contact with and wipe the sensor probe.

3. The powdery-material measurement device according to claim 2, further comprising a nozzle configured to discharge gas to blow and to remove dust or dirt adhering to the sensor probe.

4. The powdery-material measurement device according to claim 2, wherein the movable member is configured to capture and to transfer mixed-powdery materials to be delivered toward the equipment.

5. The powdery-material measurement device according to claim 1, further comprising a nozzle configured to discharge gas to blow and to remove dust or dirt adhering to the sensor probe.

6. The powdery-material measurement device according to claim 1, wherein the movable member is configured to capture and to transfer mixed-powdery materials to be delivered toward the equipment.

7. The powdery-material measurement device according to claim 1, further comprising a nozzle configured to discharge gas to blow and to remove dust or dirt adhering to the sensor probe.

8. The powdery-material measurement device according to claim 1, further comprising a nozzle configured to discharge gas to blow and to remove dust or dirt adhering to the sensor probe.

9. The powdery-material measurement device according to claim 1, wherein the sensor probe receives the reflected light from the mixed-powdery materials passing adjacent thereto.

10. The powdery-material measurement device according to claim 1, wherein the sensor probe receives the transmitted light through the mixed-powdery materials.

11. The powdery-material measurement device according to claim 1, wherein the equipment comprises a rotary compression-molding machine.

12. The powdery-material measurement device according to claim 1, wherein the movable member includes the portion facing the sensor probe and includes the standard sample, of known characteristics that include a mixing degree and are kept constant, buried and enclosed in the movable member.

13. A powdery-material measurement device configured to measure characteristics of mixed-powdery materials obtained by mixing two or more types of powdery materials and then deliver the mixed-powdery materials toward an equipment configured to execute a post process using the mixed-powdery materials, the powdery-material measurement device comprising:
 a sensor probe configured to receive reflected light from the mixed-powdery materials passing adjacent thereto or transmitted light through the mixed-powdery materials to measure the characteristics of the mixed-powdery materials while the powdery-material measurement device is in operation to deliver the mixed-powdery materials toward the equipment; and
 a movable member configured to move to pass by the sensor probe,
 wherein the movable member includes a portion facing the sensor probe and including a cleaning material configured to come into contact with and wipe the sensor probe,
 wherein the movable member includes a portion facing the sensor probe and including a standard sample buried and enclosed in the movable member, the standard sample having known characteristics and rotatably movable to face the sensor probe that is disposed to receive the reflected light from the standard sample or the transmitted light through the standard sample.

14. The powdery-material measurement device according to claim 13, wherein the movable member is configured to capture and to transfer mixed-powdery materials to be delivered toward the equipment.

15. The powdery-material measurement device according to claim 13, wherein the sensor probe receives the reflected light from the mixed-powdery materials passing adjacent thereto.

16. The powdery-material measurement device according to claim 13, wherein the sensor probe receives the transmitted light through the mixed-powdery materials.

17. The powdery-material measurement device according to claim 13, wherein the equipment comprises a rotary compression-molding machine.

18. The powdery-material measurement device according to claim 2, wherein the movable member includes the portion facing the sensor probe and includes the standard sample, of known characteristics that include a mixing degree and are kept constant, buried and enclosed in the movable member.

19. A method of checking or calibrating properties of a sensor probe configured to receive reflected light from mixed-powdery materials obtained by mixing two or more types of powdery materials and passing adjacent thereto or transmitted light through the mixed-powdery materials, in a powdery-material measurement device configured to measure characteristics of the mixed-powdery materials and then deliver the mixed-powdery materials toward an equipment configured to execute a post process using the mixed-powdery materials, the method comprising:

causing a standard sample buried and enclosed in a movable member having known characteristics to rotatably move to face the sensor probe that is configured to receive the reflected light from the standard sample or the transmitted light through the standard sample, when the mixed-powdery materials are not disposed adjacent the sensor probe while the powdery-material measurement device is in operation to deliver the mixed-powdery materials toward the equipment.

20. The method according to claim 19, wherein the standard sample, of known characteristics that include a mixing degree and are kept constant, is buried and enclosed in the movable member having known characteristics that rotatably moves to face the sensor probe.

* * * * *